US008121341B2

(12) United States Patent
Tapson et al.

(10) Patent No.: US 8,121,341 B2
(45) Date of Patent: Feb. 21, 2012

(54) DATA PROCESSING APPARATUS AND METHOD

(75) Inventors: Daniel Warren Tapson, London (GB); Daniel Luke Hooper, Surrey (GB)

(73) Assignee: Sony United Kingdom Limited, Weybridge (GB)

( * ) Notice: Subject to any disclaimer, the term of this patent is extended or adjusted under 35 U.S.C. 154(b) by 1076 days.

(21) Appl. No.: 11/720,970

(22) PCT Filed: Dec. 7, 2005

(86) PCT No.: PCT/GB2005/004682
§ 371 (c)(1),
(2), (4) Date: Nov. 9, 2007

(87) PCT Pub. No.: WO2006/061601
PCT Pub. Date: Jun. 15, 2006

(65) Prior Publication Data
US 2009/0290750 A1 Nov. 26, 2009

(30) Foreign Application Priority Data
Dec. 9, 2004 (GB) .................................. 0427030.2

(51) Int. Cl.
*G06K 9/00* (2006.01)
(52) U.S. Cl. ........................................ 382/100; 713/176
(58) Field of Classification Search .................. 382/100; 713/176
See application file for complete search history.

(56) References Cited

U.S. PATENT DOCUMENTS

| 6,477,431 B1 | 11/2002 | Kalker et al. |
| 6,788,800 B1 * | 9/2004 | Carr et al. ................... 382/100 |
| 2003/0097568 A1 | 5/2003 | Choi et al. |
| 2004/0001626 A1 | 1/2004 | Baudry et al. |
| 2004/0071312 A1 | 4/2004 | Ogawa et al. |
| 2004/0202350 A1 | 10/2004 | Tanaka |

FOREIGN PATENT DOCUMENTS
EP 1 217 840 6/2002

OTHER PUBLICATIONS

Maes, et al., "Exploiting Shift Invariance to Obtain a High Payload in Digital Image Watermarking", Proceedings of the International Conference on Multimedia Computing and Systems, vol. 1, pp. 7-12, 1999, XP000939264.

* cited by examiner

*Primary Examiner* — Vikkram Bali
*Assistant Examiner* — Katrina Fujita
(74) *Attorney, Agent, or Firm* — Oblon, Spivak, McClelland, Maier & Neustadt, L.L.P.

(57) ABSTRACT

A water marking system generates a water marked image frame for conveying a payload data word by combining at least one image frame with a two-dimensional water mark pattern. The water mark pattern includes plural regions each associated with one of symbols of the payload data word. Each region includes a two dimensional water mark block selected from a predetermined set of possible water mark blocks to represent the value of the payload data symbol associated with that region. A detecting data processing apparatus detects the payload data from a received water marked image frame, which has been encoded by utilizing a block match prior probability calculator operable to correlate each region of the water marked image frame with each of the water mark blocks from the set of water marked blocks) to form for each region a set of probability surfaces.

18 Claims, 17 Drawing Sheets

SPATIAL POSTERIORI PROBABILITIES

DATA PROCESSING APPARATUS AND METHOD

FIELD OF INVENTION

The present invention relates to a detecting data processing apparatus and method for detecting payload data which has been generated by combining an image frame with a two-dimensional water mark pattern. The present invention also relates to an encoding data processing apparatus and method operable to form a water marked image by combining payload data with a copy of the image.

BACKGROUND OF THE INVENTION

Generally, a technique for embedding data in material to the effect that the embedded data is perceptible or imperceptible in the material is referred to as water marking. Code words are applied to versions of material items for the purpose of identifying the version of the material item or for conveying data represented by the code words. In some applications, water marking can provide, therefore, a facility for identifying a particular version of the material.

A process in which information is embedded in material for the purpose of identifying a specific version of the material is referred to as finger printing. A code word, which identifies the material, is combined with the material in such a way that, as far as possible, the code word is imperceptible in the material. As such, if the material is copied or used in a way, which is inconsistent with the wishes of the owner, distributor or other rights holder of the material, the material version can be identified from the code word and take appropriate action.

In order to detect a code word in a marked material item, it is known to recover an estimate of the code word from the marked material item and to identify the code word by correlating each of a possible set of code words with the estimated code word. The code word is detected by comparing a result of the correlation with a predetermined threshold. If the correlation result exceeds the threshold then the code word of the set, which generated the correlation result, is considered to have been detected. Typically, in order to recover the estimated code word from the marked material, a copy of the original version of the material item is subtracted from the suspected marked material item. However, it may not always be possible to reproduce an original copy of the image at the detecting data processing apparatus.

In applications of finger printing to cinema, a water marked copy of a cinema image is displayed on a cinema screen. If a cinema film is then copied using, for example a hand-held video camera, to make a pirate copy, then the pirate copy can be identified, by detecting the code word, which will also be present in the pirate copy. Typically, the pirate copy of the film may suffer some distortion, either as a result of copying or as a result of processing performed on the pirate copy. For example, the original image may be distorted as a result of an angle of the video camera producing the copy with respect to the cinema screen. If the marked image is distorted in the pirate copy, then a likelihood of correctly detecting a code word, which is present in the image may be reduced. It is therefore known to register the marked image with respect to an original copy of the image so that when the original is subtracted from the registered marked copy, a code word present in the marked image will be closer to an original form of the code word. A likelihood of not detecting a code word, which is present in the marked image (false negative detection probability), is thereby reduced.

SUMMARY OF INVENTION

According to the present invention there is provided a detecting data processing apparatus for detecting payload data from a water marked image which has been generated by combining an image frame with a two-dimensional water mark pattern. The water mark pattern comprises a plurality of regions, each region of the water mark pattern being associated with one of the symbols of the payload data word. Each region of the water mark pattern includes a two dimensional water mark block selected from a predetermined set of possible water mark blocks to represent the value of the payload data symbol associated with that region. The apparatus comprises a block match prior probability calculator operable to correlate each region of the water marked image frame with each of the water marked blocks from the set of water marked blocks, to form for each region a set of probability surfaces. Each of the probability surfaces provides a two-dimensional distribution of probability vectors, for each possible water mark block, representing a probability that the water mark block is present at a position identified by that distortion vector. The detecting data processing apparatus includes a payload probabilities calculator operable to combine a distortion probability value for each region with each of the block match probability surfaces for each of the water mark blocks which may be present in the region. The payload probabilities calculator forms for each region, for each of the possible values of the payload symbol a probability value that that region includes that symbol value. The payload probabilities calculator forms, from the probability values for each symbol value from each of the regions of the water mark frame, a set of payload probability values representing the probability of each of the possible symbol values for each payload symbol, from which an estimate of the payload data can be generated from the payload probability values.

A detecting data processing apparatus according the present invention determines a probability value of each possible value of a payload data symbol for each symbol, which accommodates distortion vector probabilities for the image. By determining a probability value for each possible symbol value for each symbol in the payload data word, and maintaining this probability at an output of the detecting data processor an advantage is provided in an improved likelihood of correctly recovering the payload data. In one example the payload data is error correction encoded, the detecting data processor includes an error correction decoder which is able to use a soft decision decoding algorithm improving a likelihood of correctly recovering the payload data. This is because the probability values of each payload data symbol value for each symbol can be used as soft decisions for processing within the soft decoding algorithm.

Detecting data processing apparatus according to embodiments of the inventions combine spatial distortion vectors with a calculation of the probability of each symbol value being present within the payload data for each symbol. To this end, a water mark image frame is formed using a water mark pattern having a plurality of regions. Each region is assigned to one of the symbols in the payload data word. The value of each data symbol in the payload data word is represented by one of a set of water mark blocks, each block in the set representing one of the possible values of the payload symbols. The water mark blocks are therefore selected for each region of the water mark frame in accordance with the value of the symbol which that region represents in the payload data word. A block match probabilities calculator in the decoder is arranged to generate a probability surface providing a two dimensional distribution of distortion vectors, for each possible water mark block which could be present in that water mark region. Combining each probability surface for each possible water mark block for the region with a distortion vector probability calculated for that region, a probability value for each possible symbol value for the region is produced which corresponds to a position in the payload data. As such, the distortion vector probability has been incorporated into the calculation of the possible symbol values, therefore utilising all information associated with detecting the payload data symbols, thereby increasing a likelihood of detecting the symbols correctly.

As referred to above and in the following description, the block match prior probability calculator correlates each region of the water marked image frame with each of the water marked blocks from the set of water marked blocks, to form for each region a set of probability surfaces. The term correlation as used with reference to the operation of the block match prior probability calculator is used to refer to a process in which probability surfaces are formed from the local probability values (or their derivative approximations) and the watermark blocks. A value in a probability surface is calculated from the product of all the probabilities of the pixels in the image region carrying watermark samples of the size and sign indicated by the corresponding positions within the watermark block. This operation can be efficiently implemented for all distortion vectors (positions in the probability surface) at once by taking the log of the probability values (or, more accurately, the log of the derivative) and performing a cross-correlation (or filtering) with the watermark block.

According to an aspect of the present invention there is provided an encoding data processor operable to form a water marked image by combining payload data with a copy of the image. The encoding data processor comprises a water mark block generator operable to generate each of a set of two-dimensional blocks of water mark coefficients each being representative of one of a plurality of possible values of payload data word symbols. A water mark frame pattern former is operable to form a water mark frame comprising a plurality of regions, each region being associated with one of the symbols in the payload data. The water mark frame former is operable to select one of the water mark blocks from the set of water mark blocks in accordance with the symbol value of the payload symbol associated with the region to form a water mark frame pattern. The frame former combines the water mark frame pattern with the copy of the image frame to form the water marked image frame.

Various further aspects and features of the present invention are defined in the appended claims. These aspects include a method of detecting payload data and a method of forming a water marked image.

BRIEF DESCRIPTION OF THE DRAWINGS

Embodiments of the present invention will now be described by way of example only with reference to the accompanying drawings, where like parts are provided with corresponding reference numerals, and in which.

DESCRIPTION OF EXAMPLE EMBODIMENTS

Water Mark Encoder

Figure 1:
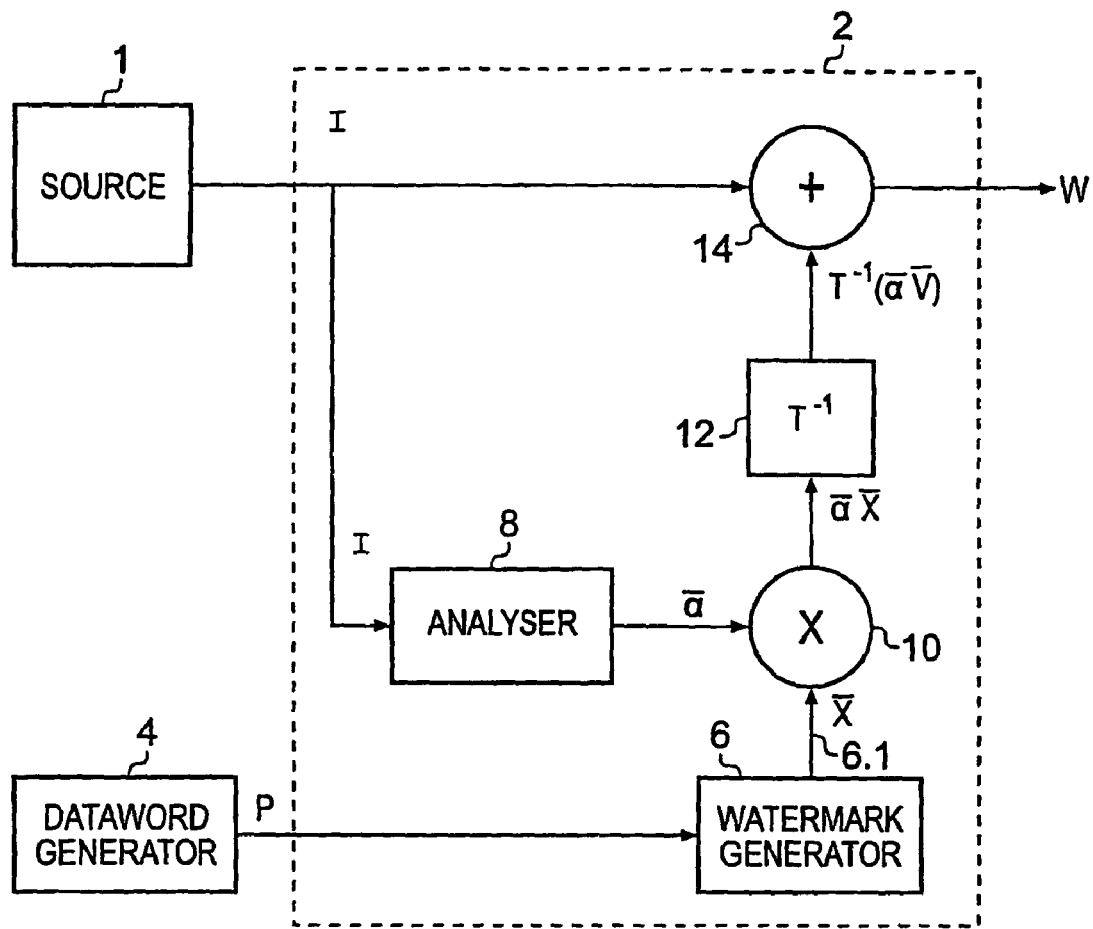
FIG. 1 is a schematic block diagram of an encoding apparatus for combining an image with a code word.

An encoding data processing apparatus, which is operable to generate water marked images by combining a water mark code word with the images, is shown in FIG. 1. The encoding data processing apparatus shown in FIG. 1 is arranged to combine the code word with the image to form the marked copy in a base band domain of the original image. In FIG. 1 images I are generated by a source 1 and fed to an encoder 2 which is arranged to combine payload data words P generated by a data word generator 4 so that at the output of the encoder 2 a marked copy W of the images I is formed. The encoder 2 shown in FIG. 1 includes a code word generator 6 which arranges the code word coefficients into a form corresponding to a transform domain representation of the image. Weighting factors are then generated by a perceptual analyser 8 in accordance with a relative ability of the image to carry the code word coefficients with a maximum strength whilst minimising a risk of the code word being perceivable when added to the image I. The weighting factors are received by a strength adaptor 10 and combined with the code word coefficients to form weighted code word coefficients. The weighted code word coefficients are then transformed into the base band domain by an inverse transform processor 12, which performs an inverse transform on the code word. The base-band domain code word is then combined with the base band domain image by a combiner 14 to form the marked copy of the image W.

In the following description the term "samples" will be used to refer to discrete samples from which an image is comprised. The samples may be luminance samples of the image, which is otherwise, produce from the image pixels. Therefore, where appropriate the term samples and pixels are inter-changeable.

In some embodiments utilising the present technique, the transform domain representation of the code word may include a Discrete Cosine Transform (DCT), a Fourier Transform or a Discrete Wavelet Transform For example, the code word could be formed as if in a DCT domain, so that the inverse transform processor 12 may be arranged to perform an inverse DCT on the code word coefficients before being spatially and/or temporally up-sampled. Accordingly the code word may be spread more evenly across the frequency band of the image.

According to one example, the transform domain representation includes either a temporal and/or spatial down-sampled representation with respect to a sampling rate of the base band domain image. The code word is therefore arranged in a form or treated as if the code word were in a form in which it had been spatially and/or temporally down-sampled with respect to the base band version. As such the inverse transform processor is arranged to temporally and/or spatially up-sample the code word coefficients to form a base band version of the code word, in which form the code word is combined with the base band image I to form the marked copy of the image W.

Figure 2:
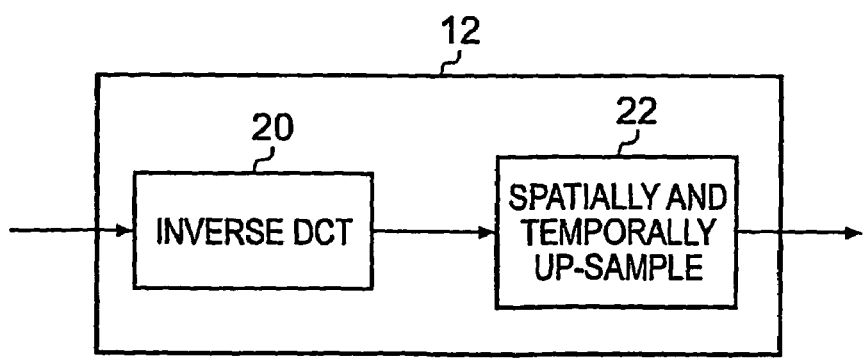
FIG. 2 is a schematic block diagram of an inverse transform processor forming part of the apparatus shown in FIG. 1.

An example of an inverse transform processor 12 is shown in FIG. 2 in more detail. As shown in FIG. 2, the inverse transform processor 12 includes an inverse DCT transformer 20 which performs an inverse DCT on the down-sampled code word as formed into a DCT domain image. An up-sampling processor 22 is then operable to spatially and/or temporally up-samples the code word to provide a sampling rate which corresponds to that of the base band domain image.

According to the present technique water mark code words are generated in the form of water mark patterns and combined with each frame of a video source which form a water mark image. The water mark patterns are formed as a combination of two dimensional blocks each of which is added to a correspondingly sized region of an area of the image. An example is illustrated in FIG. 3.

Figure 3:
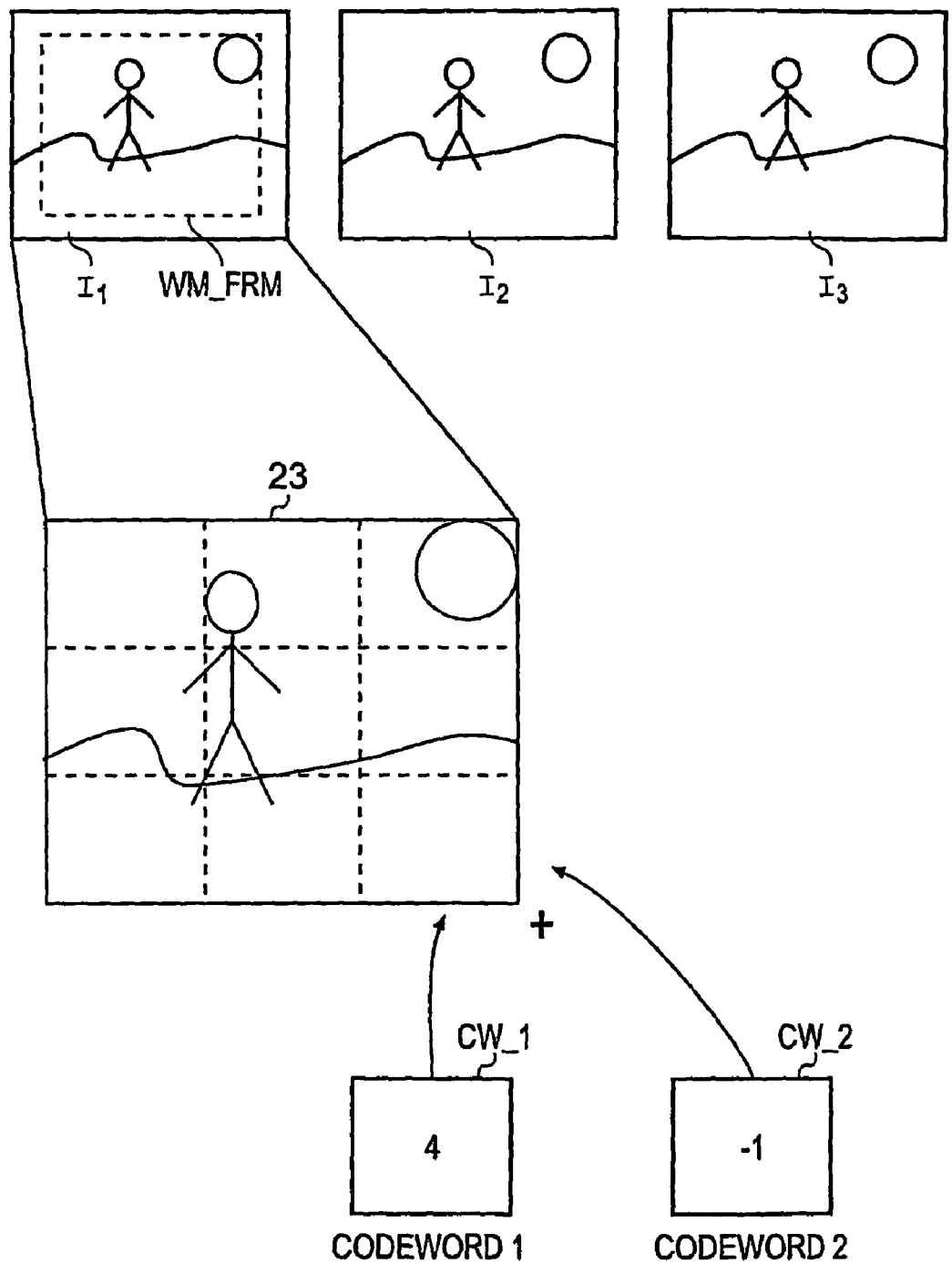
FIG. 3 is a schematic illustration of the operation of the encoding data processor shown in FIG. 1.

In FIG. 3 each of a series of three image frames $I_1$, $I_2$, $I_3$ are illustrated as comprising a particular content of an image scene. Within the image frame a smaller rectangular area WM_FRM is shown in an expanded form 23. For the present example the water marked image frame WM_FRM comprises nine equally sized sections formed by dividing equally the water marked image frame WM_FRM. The watermark code word is added throughout the image frame. If part of the frame is lost as a result of cropping, then more frames may be required to decode the payload.

According to the present technique a correspondingly sized block is generated and combined with each of the regions of the water marked image frame to the effect that the size of the block corresponds to the size of the region. As will be explained with reference to FIG. 4 the present technique uses two water marks which are overlaid. That is to say a water mark block for a first code word CW_1 is combined with each region and a water marked block from a second code word CW_2 is combined with the same region. As will be explained the first code word CW_1 pattern of blocks is provided in order to perform blind registration of a received water marked image whereas the second codeword is used to convey payload data. The water mark generator 6 is shown in more detail in FIG. 4.

Figure 4:
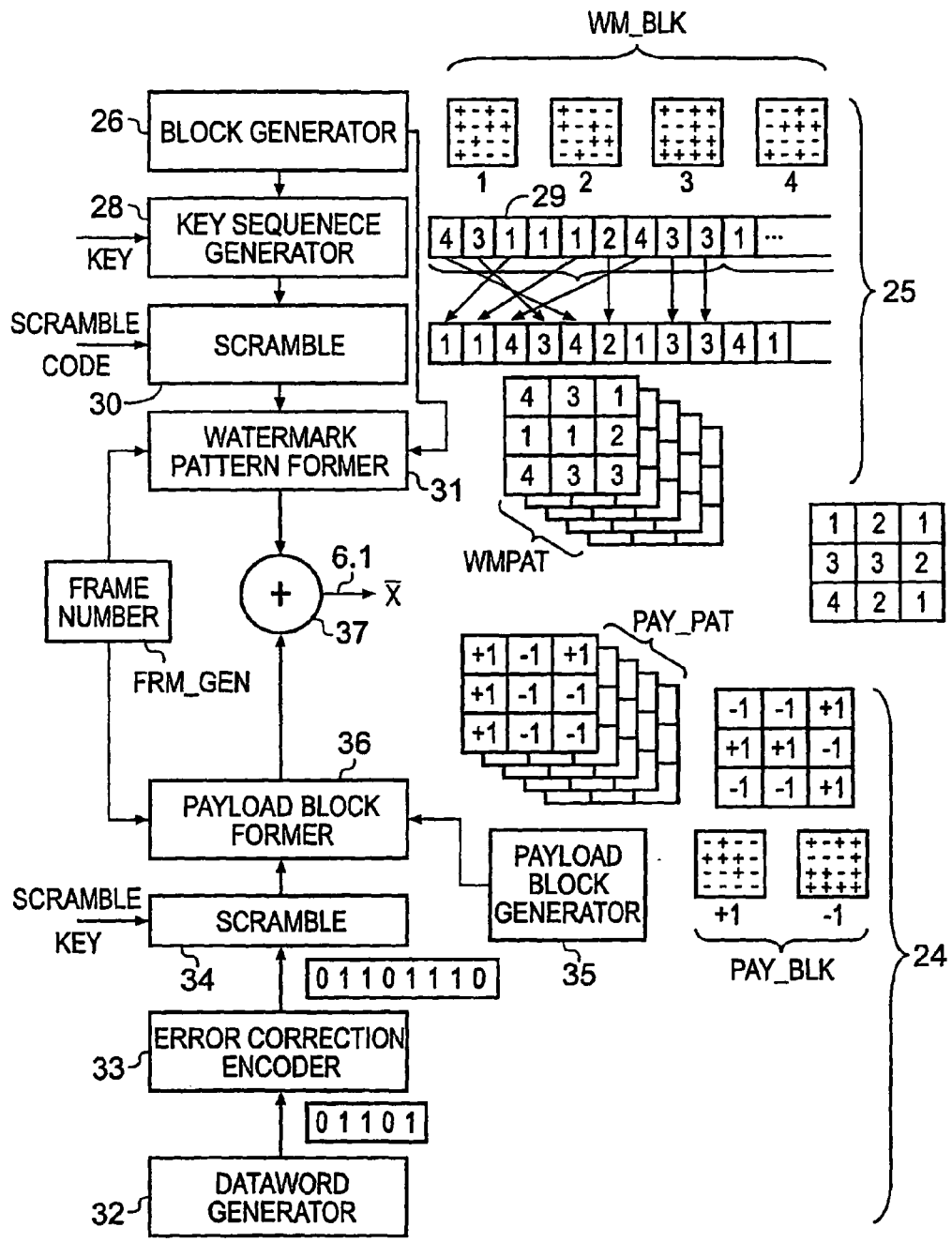
FIG. 4 is a part schematic block diagram, part schematic illustration of the operation of a water mark code word generator appearing in FIG. 1.

A water mark generator for generating a first water mark frame is illustrated in the lower half 24 of FIG. 4 whereas the upper half 25 of FIG. 4 illustrates parts of the water mark generator 6 which generate a second water mark pattern. The first water mark referred to as a payload water mark and is generated to represent payload data conveyed by the water marked image. The second water mark pattern is used to detect distortion and identify a frame number within the video image sequence so that the water marked image sequence can be registered without a requirement for an original version of the image sequence.

In FIG. 4 a first block generator 26 is arranged to provide a sequence of water mark blocks providing a two dimensional arrangement of code word coefficients. As illustrated in FIG. 4 for the present example the block generator 6 generates four blocks of a predefined group each of which provides a two dimensional arrangement of water marks code word coefficients. As mentioned above this water mark is for permitting registration of the watermarked image and frame synchronisation. Within the code word generator 6 a key sequence generator 28 is provided using a key to generate a long sequence of index numbers within a predetermined range of numbers corresponding to a number of different water marked code word blocks generated by the block generator 26. Each of the block numbers of the long key sequence 29 is scrambled by a scrambler 30 with the effect that each of the block numbers which are to form a water mark pattern for one of the frames are re-arranged in accordance with a predetermined scrambling code. The scrambled key sequence is then fed to a water mark pattern former 31 which forms a water mark pattern per image frame by using the index numbers provided within the long key sequence to select one of the four water marked blocks WM_BLK. Thus as illustrated in FIG. 4 the water mark pattern generator forms water mark patterns WM_PAT. The water mark pattern former 31 also receives a frame number which identifies the respective frame to which a particular one of the water mark patterns WM_PAT is to be added. The length of the long key sequence may be such that a different water mark pattern is generated for each of a predetermined sequence of frames, before the sequence repeats.

In some embodiments, a watermark pattern may be non-periodic in that the pattern does not have a temporal period. This is done using a number of secretly keyed jumps. For example, if at the decoder, the decoder determines that the most likely current frame number is 527, then there is a 50% chance that the next frame will be 528 and a 50% chance that the next frame will be 35. As a result, it is more difficult for an attacker to correctly estimate the frame number.

According to the present technique the watermark pattern WM_PAT is formed by cyclically shifting the reference pattern from one frame to the next before scrambling. This can be effected either as one step of the cycle or as a keyed jump in the cycle providing a keyed number of cyclic shifts of the pattern from one frame to the next.

The water mark payload generator illustrated in the lower half 24 of FIG. 4 comprises a data word generator 32 which generates the payload data which is to be conveyed by the water marked image sequence. The data word is then error correction encoded by an encoder 33 before being scrambled by a corresponding scrambler 34 using a second scrambling code to scramble the bits of the encoded data word. A payload block generator 35 generates one of two two-dimensional payload blocks PAY_BLK comprising code word coefficients which are to be added to one of the regions of the water marked frame WO_FRM. One of the payload water mark blocks is to be representative of a one (+1) and the other which is formed from an inverse of the water marked code word coefficients is to represent a minus one (−1) or a zero within the encoded payload code word.

The scrambled and error correction encoded code word is received by a payload block former 36 is used to select a minus one block (−1) for a value zero and a plus one block (+1) for a value 1. Each of the bits in the encoded payload data word is therefore assigned to one of the regions of each of the water mark image frames. The payload block former 36 is operable to select the corresponding payload water mark block depending on whether a 0 or 1 is present in the encoded code word. Thus the payload patterns PAY_PAT are formed for each image frame.

The payload watermark pattern is also a water mark pattern although this will be referred to as a payload code words or a payload water marked pattern in order to distinguish this from the water marked pattern to be used for detecting distortion and the frame number in accordance with a blind registration method and apparatus which will be described shortly. Finally as illustrated in FIG. 4 the water marked pattern formed by the water marked pattern former 31 is fed to a combiner 37 with a water marked pattern from the payload block former 36. The two water mark code words are combined together to produce on an output conductor 6.1 a composite water mark code word for each frame in the form of a two dimensional water mark pattern. As illustrated in FIG. 3 the water mark pattern is combined with the images of the video sequence to be water marked.

Figure 5:
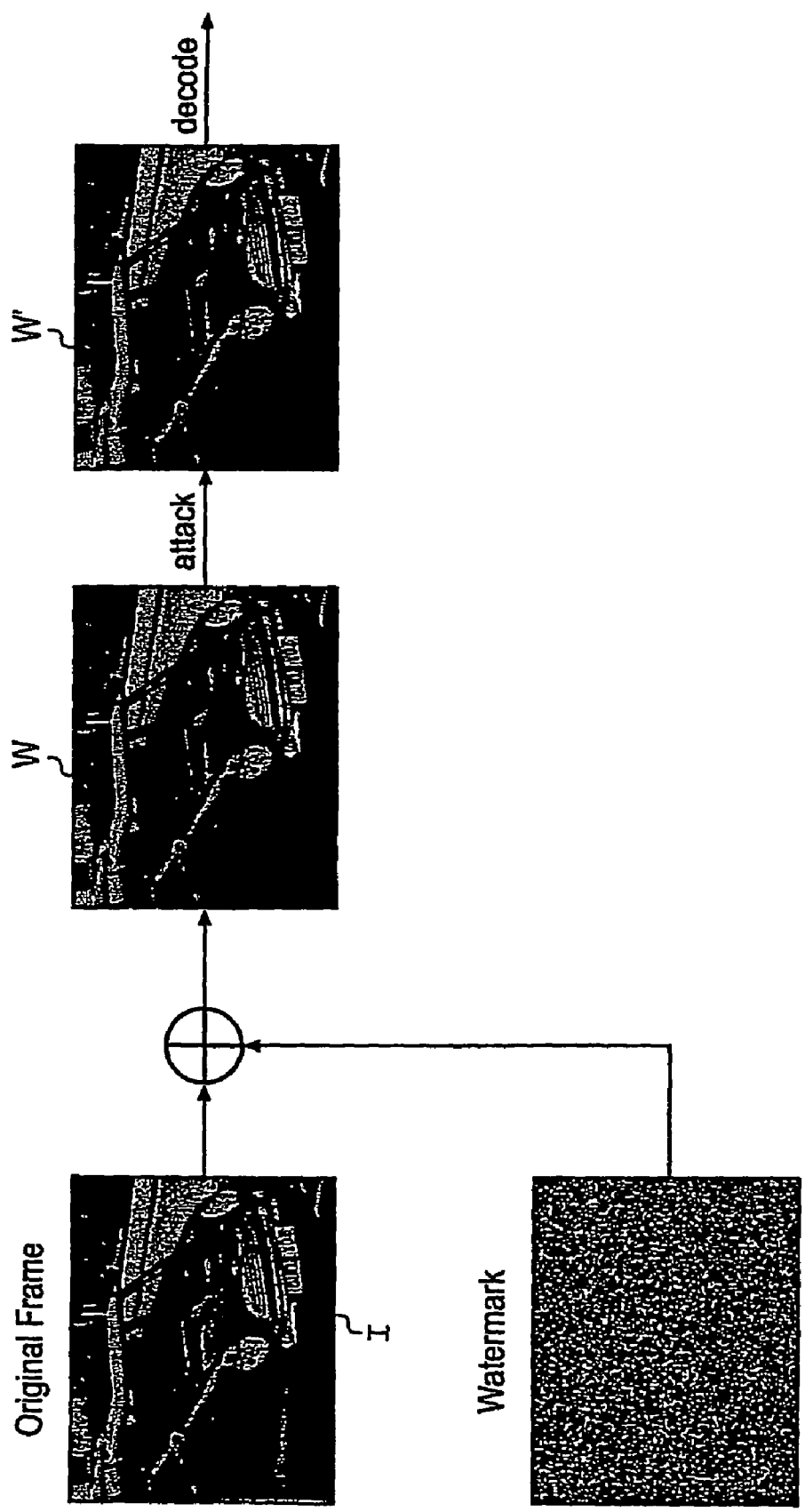
FIG. 5 is an example illustration of an original image with a water marked version of the image which has been distorted, and from which the distortion should be removed to detect the code word present in the marked image.

FIG. 5 provides an example illustration of a technical problem which the detecting apparatus is required to ameliorate in order to detect a code word in the water marked image W'. As shown in FIG. 5, a water marked image W is formed by combining a water mark code word X with a copy of the original image I. Distortion may be applied to the water marked image either deliberately by an attacker aiming to disrupt the water marking system or at a time of capture of the water marked image. As a result a distorted version of the water marked image W' is formed, from which the code word embedded in the image must be detected in order to identify the water marked image.

Detecting Processor

Figure 6:
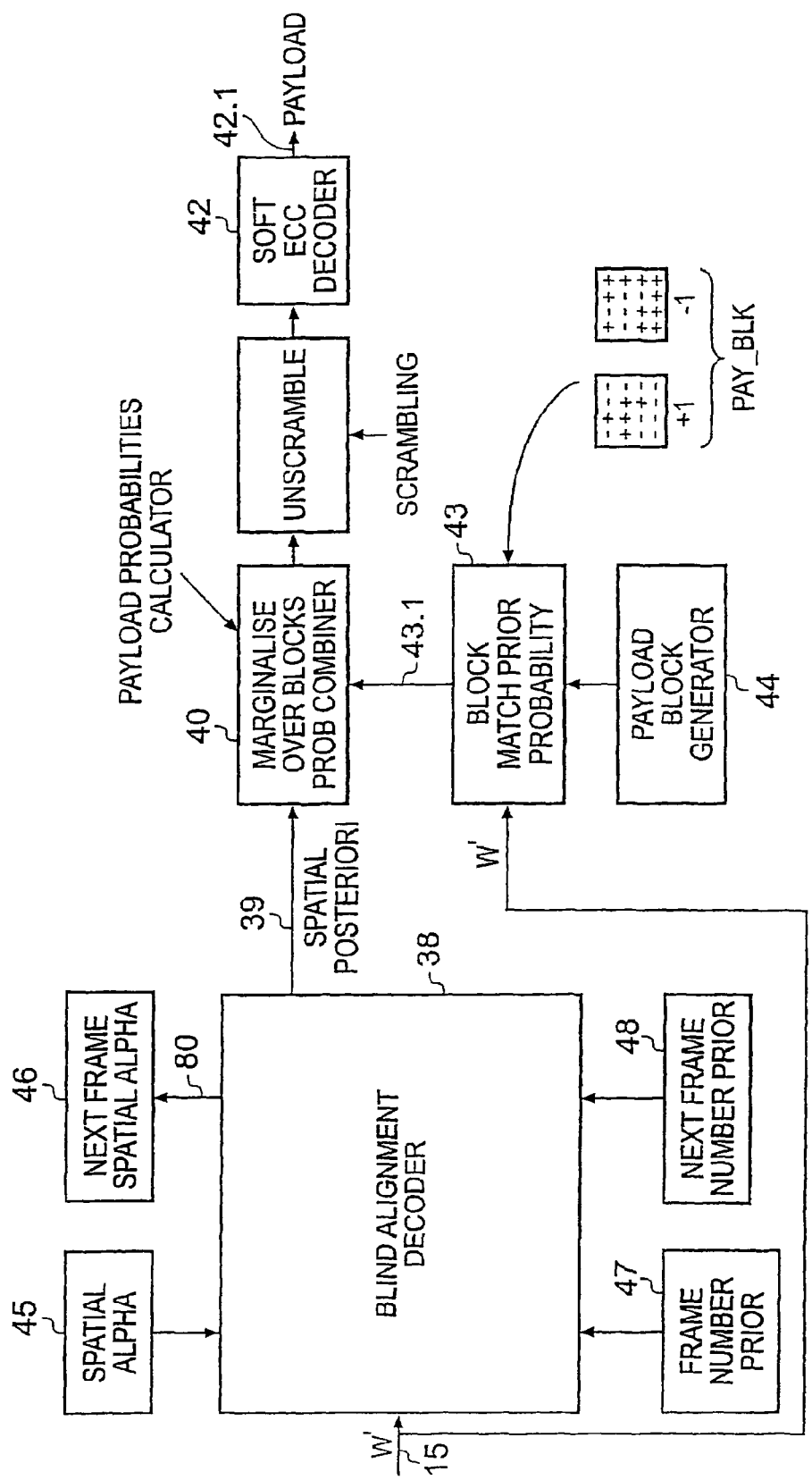
FIG. 6 is a schematic block diagram of detecting data processor, which is arranged to detect payload data conveyed by the water marked image.

According to the present technique the payload data is recovered from the water marked image produced by the encoder illustrated in FIG. 3 without using a copy of the original image. That is a so-called blind registration process is performed in which the original water marked image is processed to identify any distortion within the water marked image and to identify each of the corresponding original frame numbers of the encoded image so that the payload data can be recovered. FIG. 6 provides an example detecting apparatus, which can be used in accordance with the present technique.

In FIG. 6 a water marked image sequence is received by a blind alignment decoder 38 which is operable to calculate for each region within the water mark frame area W_FRM shown in FIG. 3 a probability distribution of possible distortion vectors for that region for each image, which form spatial posteriori probabilities. Whilst a most likely distortion vector could be calculated for each region, in some examples of the present technique, a most likely distortion vector is not selected, but rather a probability distribution of possible distortion vectors is maintained to provide 'soft decision' information. The blind alignment decoder 38 uses the first water mark pattern (registration water mark) to calculate the spatial posteriori probabilities and to determine frame synchronisation. The spatial posteriori probabilities are supplied on a channel 39 to a payload probabilities calculator 40. The payload probabilities calculator 40 also receives for each region of each frame a probability surface that the region contained a positive water mark block and a probability surface that the region contained a negative water mark block. To obtain a scalar probability value from the probability surfaces that the region contains a positive watermark block or a negative watermark block, the spatial variables are marginalised. The payload probabilities calculator 40 then unscrambles the probability values associated with each region in accordance with a scrambling code used at the encoder to form error correction encoded data words with each bit being represented by a probability value of that bit being a one and a probability value of that bit being a zero. These payload probability values are fed to a soft decision decoder 42 in order to perform soft decision error correction decoding to recover the payload data with an increased likelihood that payload data represented the water marked video images can be recovered correctly.

As illustrated in FIG. 6 the block match prior probability calculator 43 receives reproduced versions of the payload water mark blocks PAY_BLK. As will be explained shortly the block match prior probability calculator 43 can correlate each of the different water mark payload blocks PAY_BLK with respect to a corresponding region within the water marked image in order to generate the probability surfaces of the likelihood of the positive and negative payload blocks.

The blind alignment decoder 38 uses two data stores 45, 46 for storing spatial alpha probabilities and next frame spatial alpha probabilities and two data stores 47, 48 for storing frame number prior probabilities and next frame number prior probabilities. The operation and utilisation of the data stores will be explained in the following section with reference to FIG. 7, which provides and explanation of the operation of the blind alignment decoder 38.

Figure 7:
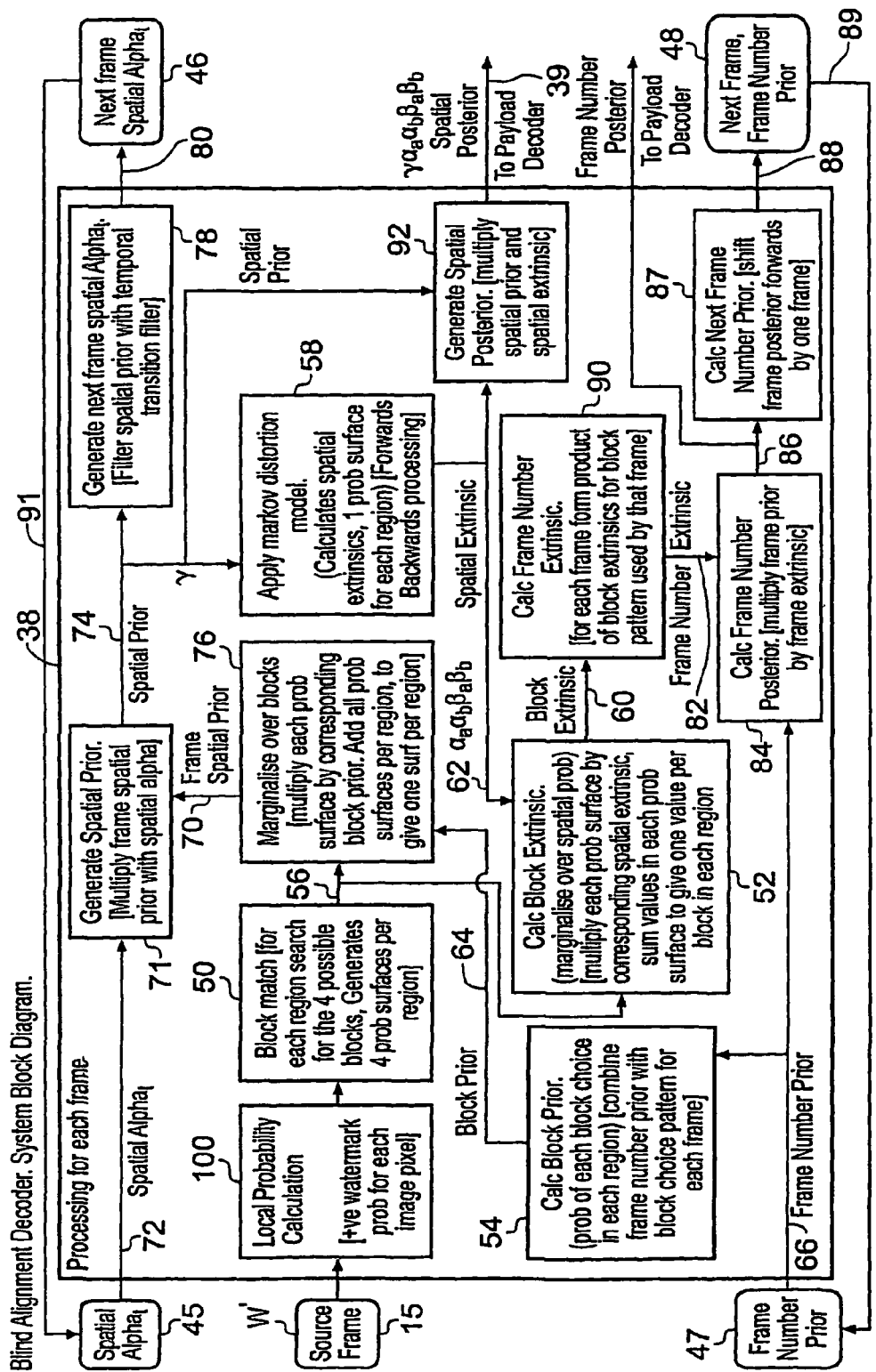
FIG. 7 is a schematic block diagram of a blind alignment decoder which appears in FIG. 6, which is operable to calculate distortion probability vectors and frame synchronisation.

In FIG. 7 the water marked image frames are received by a block matched prior probability calculator 50 via a local probability calculation function 100. The local probability calculation function serves to generate a likelihood of detecting the regions of the water marked image. The operation of the local probability calculator is explained in more detail in Annex 1.

Figure 8:
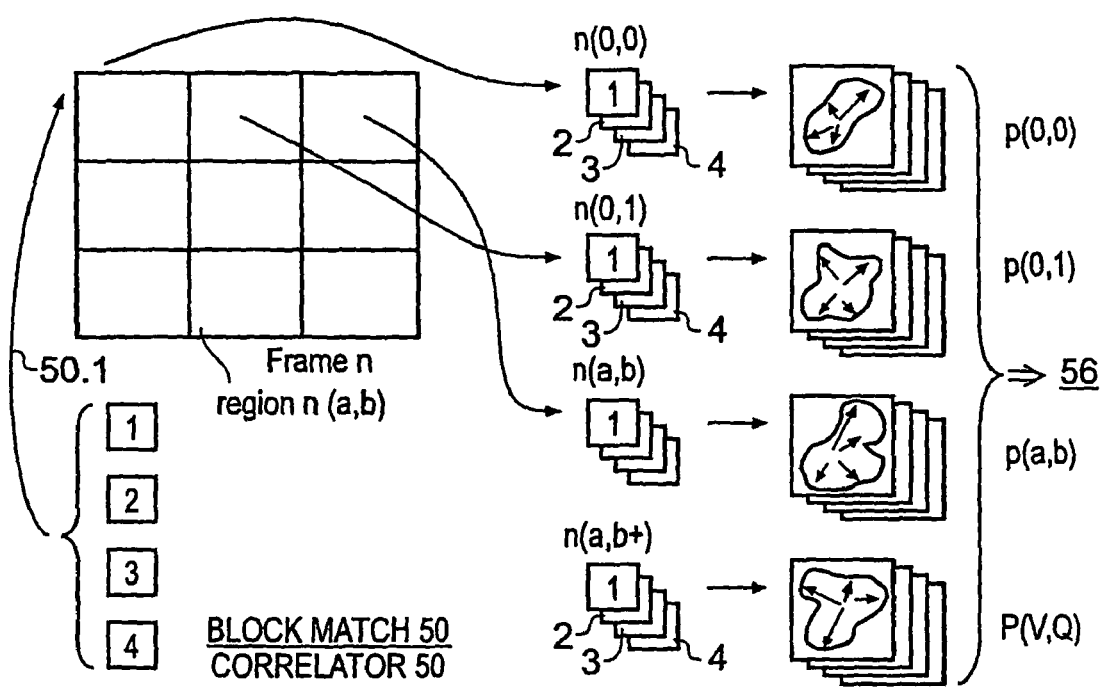
FIG. 8 is a schematic illustration of the operation of a block match calculator which appears in FIG. 7.

The operation of the block match prior probability calculator 50 is illustrated in FIG. 8. As shown in FIG. 8 each of the regions of the water marked image frame is correlated with each of the different water marked blocks of the registration water mark which are reproduced within the block match prior probability calculator 50. FIG. 8 provides a conceptual illustration of the effects of processing the water marked image. As illustrated by the arrow 50.1 each of the four water marked registration block values is calculated within a region around the region in which the water marked code word blocks were added by the encoder. As a result of the correlation a probability surface is formed for each of the possible water mark blocks which could have been added to that region. The probability surface provides a two dimensional distribution of distortion vectors identified by the correlation. The correlation of each of the possible water mark blocks is performed for each region so that for each of the four possible blocks for each region there is provided a probability surface representing a likelihood that one of the possible water marked blocks is present.

The term correlation is used to refer to a process in which probability surfaces are formed from the local probability values (or their derivative approximations) and the watermark blocks. A value in a probability surface is calculated from the product of al the probabilities of the pixels in the image region carrying watermark samples of the size and sign indicated by the corresponding positions within the watermark block. This operation can be efficiently implemented for all distortion vectors (positions in the probability surface) at once by taking the log of the probability values (or, more accurately, the log of the derivative) and performing a cross-correlation (or filtering) with the watermark block.

The probability surfaces provided for each possible water marked image block for each region are fed via a channel 56 to a block probability combiner 76. As will be explained shortly, the block probability combiner 76 is arranged to marginalise the block number variable by multiplying each probability surface by corresponding block prior probabilities and adding all probability surfaces per region to give one surface per region. Effectively therefore each of the probability surfaces for each possible water mark block type per region are collapsed to form a single probability surface representing a spatial distortion probability estimate for that image frame. The operation of the distortion probability calculator 76 is illustrated in FIG. 9.

Figure 9:
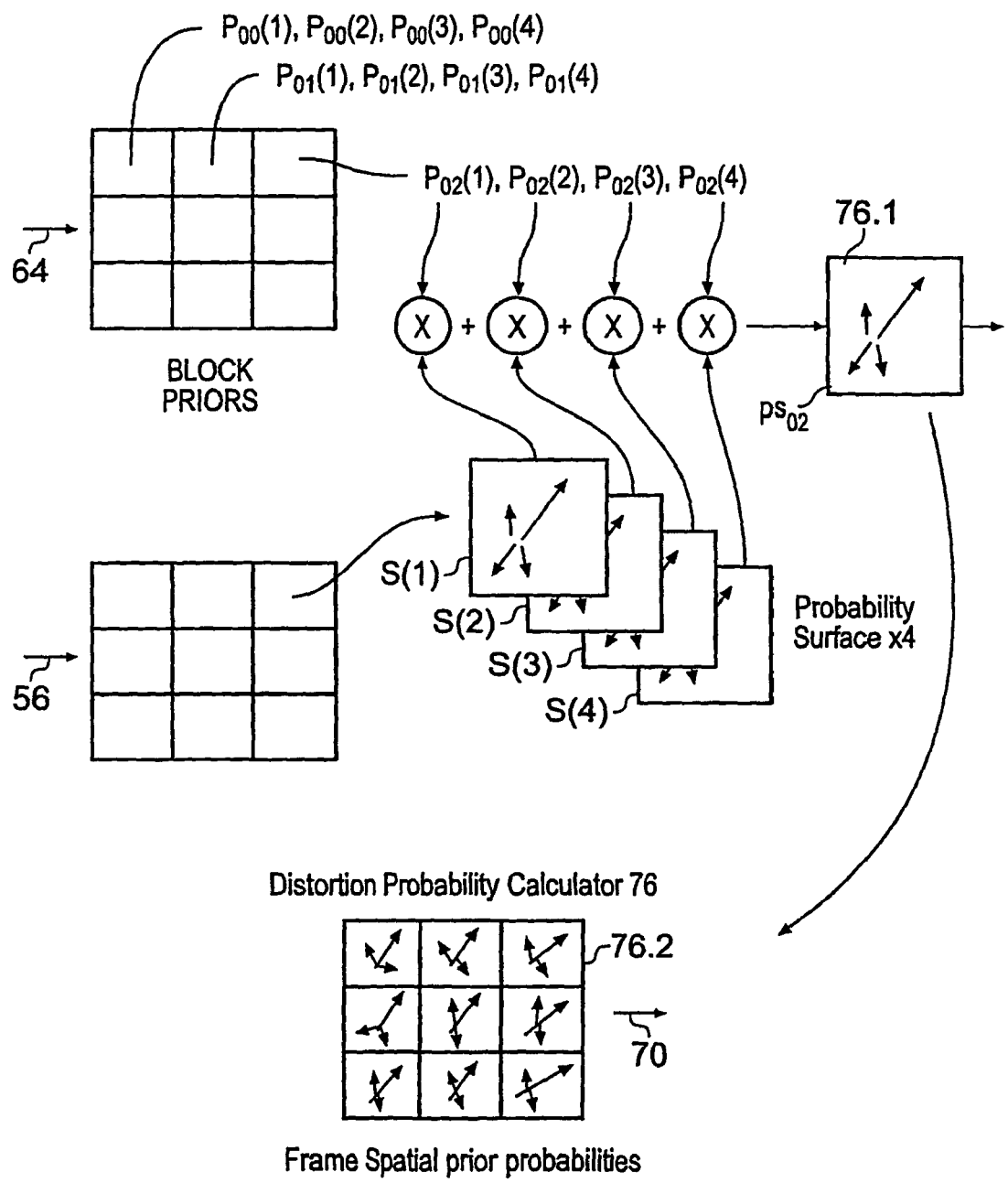
FIG. 9 is a schematic illustration of the operation of a distortion probability calculator, which appears in FIG. 7.

As illustrated in FIG. 9 the distortion probability calculator 76 receives on an input channel 64, block prior probabilities which are used to form a single probability surface for each region of the water marked image frame. The generation of the block prior probabilities will be explained shortly with reference to FIG. 10. However, as shown in FIG. 9 the probability surfaces provided by the block match correlator 50 are multiplied with each of the block prior probabilities which are provided for each region of the water marked image frame. As shown in FIG. 9 for each of the four probability surfaces for each region an effect of forming the dot product with the corresponding block prior probabilities for the corresponding region is to form a single probability surface 76.1. As a result the probability surfaces are combined for each region which provides frame spatial prior probabilities 76.2 providing one probability surface for each region which are output on a conductor 70. The operation of the block prior probability calculator 54 shown in FIG. 7 will now be explained with reference to FIG. 10 providing a conceptual illustrative flow diagram of the operation of the block prior probability calculator 54.

Figure 10:
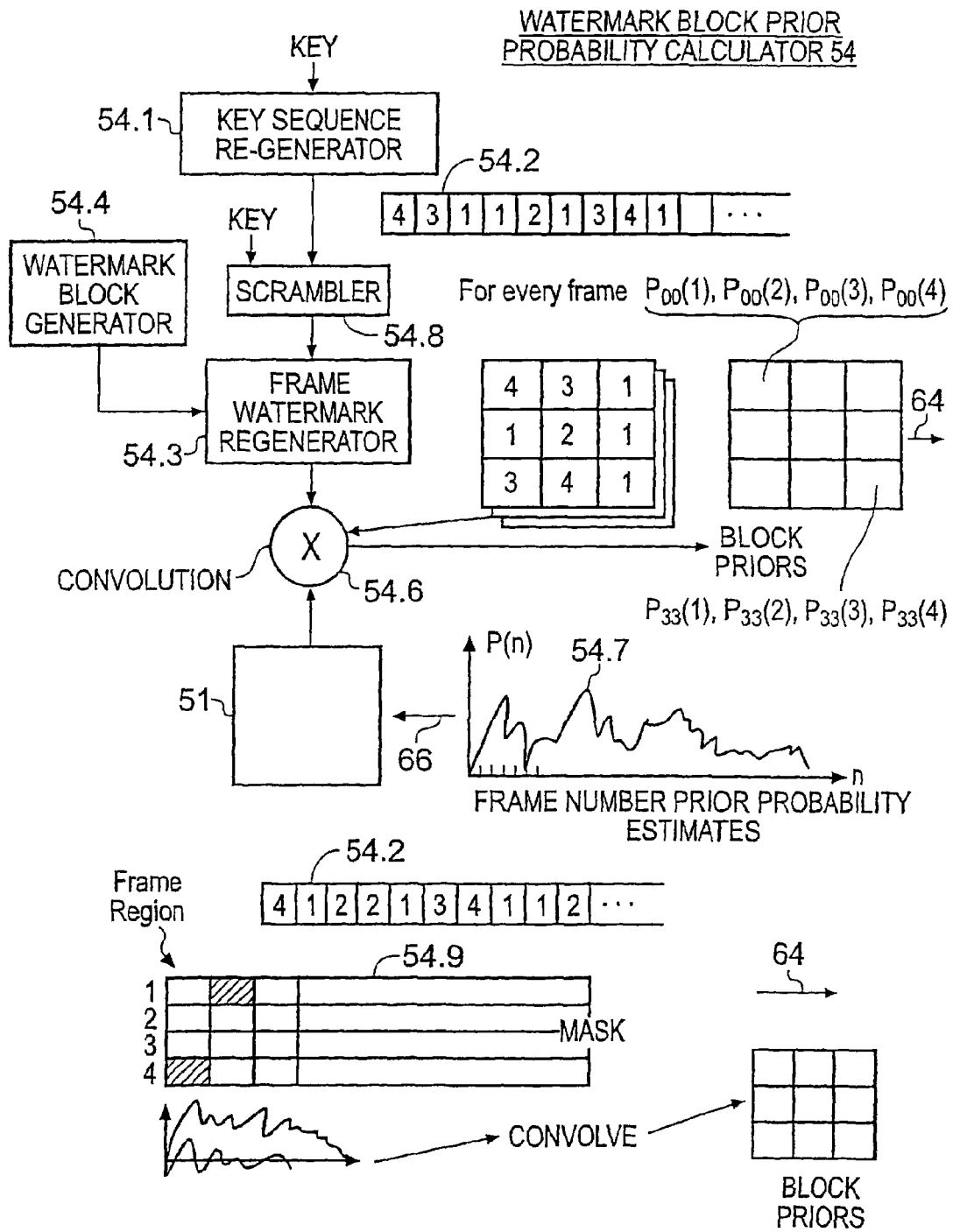
FIG. 10 is a schematic illustration of the operation of a block prior probability calculator, which appears in FIG. 7.

As shown in FIG. 7 the block prior probability calculator 54 receives a frame number prior probabilities estimate from a channel 66 from the frame number priors store 47. The frame number prior probabilities is an accumulated estimate that each frame in the possible sequence of frames is the current frame being processed. As shown in FIG. 10, to generate the block prior probabilities a key sequence generator 54.1 re-generates of long key sequence from which the water mark frames can be formed. The long key sequence is an unscrambled reference sequence for frame 0, for which non cyclic shifts have been made. The key sequence regenerator 54.1 also receives the key which was used in the encoder to generate the long key sequence so that the reference sequence at the decoder is the same as that at the encoder. Accordingly, the long key sequence 54.2 is fed to a frame water mark regenerator 54.3.

The frame water mark generator 54.3 also receives each of the water mark blocks in the set of water mark blocks, the key sequence and the water mark blocks. The decoder does not need the actual watermark patterns for each block in order to calculate the block priors from the frame priors. The water mark patterns are formed by selecting the blocks in accordance with the index provided within the key sequence thereby reproducing the water mark frame patterns for each frame in the sequence of frame. The decoder therefore uses the frame priors and the keyed reference sequence.

At this point the decoder is unaware of which of the sequence of frames the current frame corresponds. However, the decoder maintains a running estimate of the probability that the current frame is that frame within the sequence which is the frame number prior probabilities maintained within the data store 47. These are fed via the channel 66 to the block prior probability calculator 54. The frame number prior probabilities are then fed to a second input of a convolution processor 54.6 which also receives the water marked frame patterns 54.5. The convolution processor 54.6 then forms the block prior probabilities from the unscrambled reference sequence and the frame prior probabilities.

The block prior probabilities comprise for each region within the current frame a probability of each of the possible water mark blocks in the set of water mark blocks being present within that region. Thus as shown by the illustration of the current water mark frame 54.7 each region comprises a probability Pab(n) where a is the row index and b is the column index and n is the index from 1 to 4 of the possible water mark blocks.

At the bottom of FIG. 10 an illustration is presented of an efficient way of calculating the block prior probabilities from the key sequence 54.2 and the frame number prior probabilities. This is done by convolving the frame number prior probabilities with a reference mask 54.9 which represents the presence or absence of a particular water mark block within each regenerated water mark frame pattern. The block prior probabilities can be calculated efficiently by convolving the reference mask 54.9 with the frame number prior probabilities, to produce the block prior probabilities. This is because the reference mask 54.9 provides for each column the corresponding region within the water marked pattern and within each column a probability value of 1 against the particular water mark block which should be present within that region for that frame in a predetermined sequence. All other regions in the column are set to zero.

Figure 11:
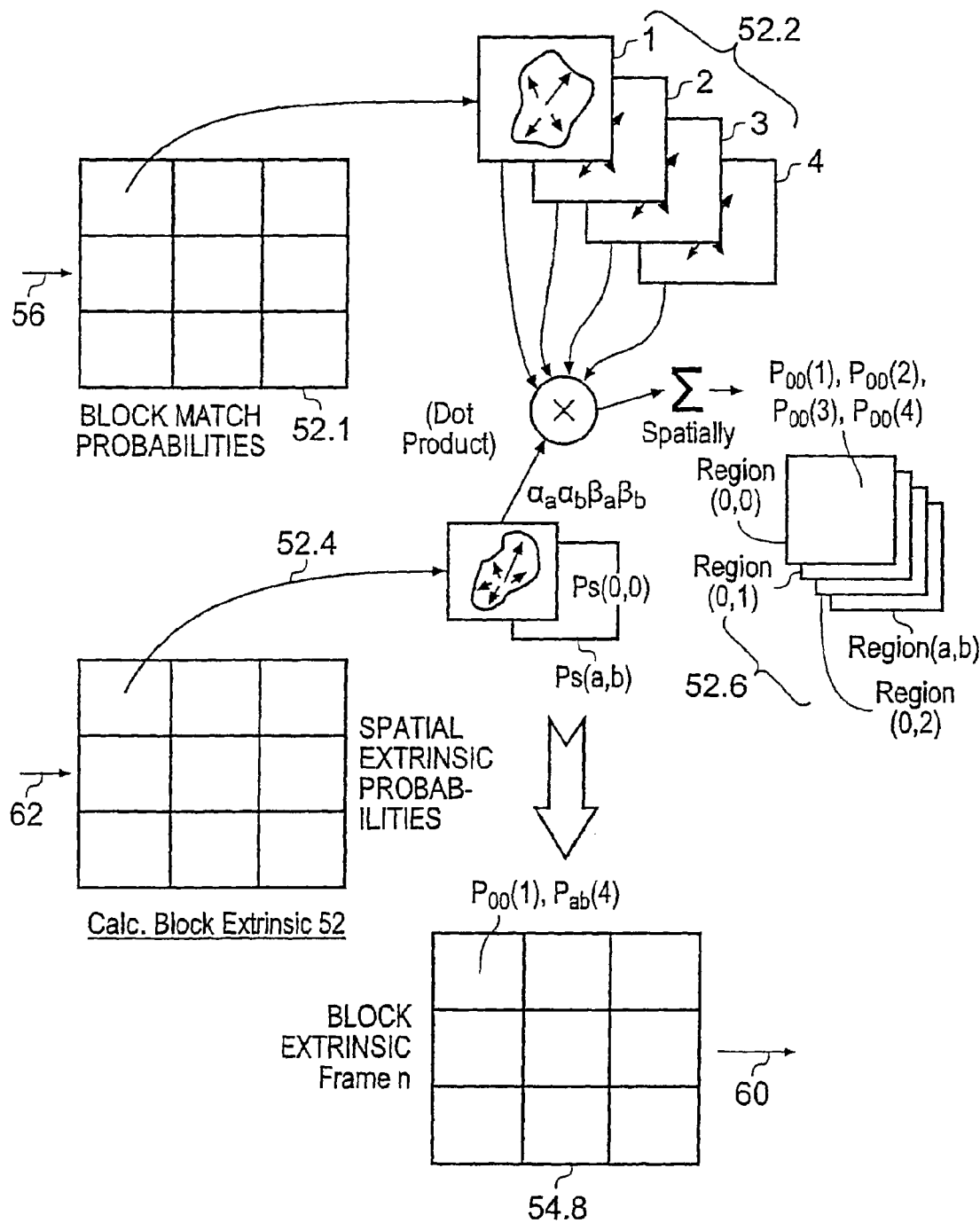
FIG. 11 is a schematic illustration of the operation of a block extrinsic probability calculator, which appears in FIG. 7.

Returning to FIG. 7 the block match probabilities fed on channel 56 are also received by a block extrinsic calculator 52. The block extrinsic calculator 52 is shown in more detail in FIG. 11. As shown in FIG. 11 the block match probabilities are received on the channel 56 and as illustrated in FIG. 8 provide for each region of the current water marked image frame four probability surfaces, one for each possible water mark block which could be present in that region. Thus as illustrated in FIG. 11 by an arrow 52.1 with respect to the first region in column=0 row=0, four probability surfaces 52.2 are provided and correspondingly each region will provide four probability surfaces. The block extrinsic calculator 52 also receives on a channel 62 for the current frame a set of spatial extrinsic probabilities which are derived from the spatial frame prior probabilities generated on the conductor 70 by the distortion probability calculator 76. The generation of the spatial extrinsic probabilities from the frame spatial prior probability will be explained shortly. As illustrated in FIG. 11 the spatial extrinsic probabilities provide for each region of the water mark frame a probability surface representing a two dimensional distribution of distortion vectors for that region. Thus the probability surface provides a possible distribution of distortion within that region. Thus as shown with the arrow

52.4 the first region in column=0 row=zero provides a single probability surface (ps(0,0) and correspondingly each region will provide a corresponding probability surface.

The block extrinsic calculator 52 is arranged to generate for each region of the water mark frame a probability of that value for each of the four possible water mark blocks. The probability value for each water mark block for each region a likelihood that that region contained the water mark block index number from the set of possible water mark blocks in the current image frame. These are the block extrinsic probabilities. The block extrinsic probabilities are calculated by forming a dot product between the probability surface provided for each region by the spatial extrinsic probabilities and the probability surface for each possible water mark block for each region. The dot product is calculated by doing a point by point multiplication and sum to form a single probability value for each possible water mark block. Thus the block extrinsic probabilities are represented as probability values 52.6 for each region which may also be represented for the current frame with respect to the corresponding region by a frame of block extrinsic probabilities 54.8. The block extrinsic probabilities are then output on a channel 60 as shown in FIG. 7 to a frame number extrinsic probability calculator 90. The frame number extrinsic probability calculator 90 is shown in more detail in FIG. 12.

Figure 12:
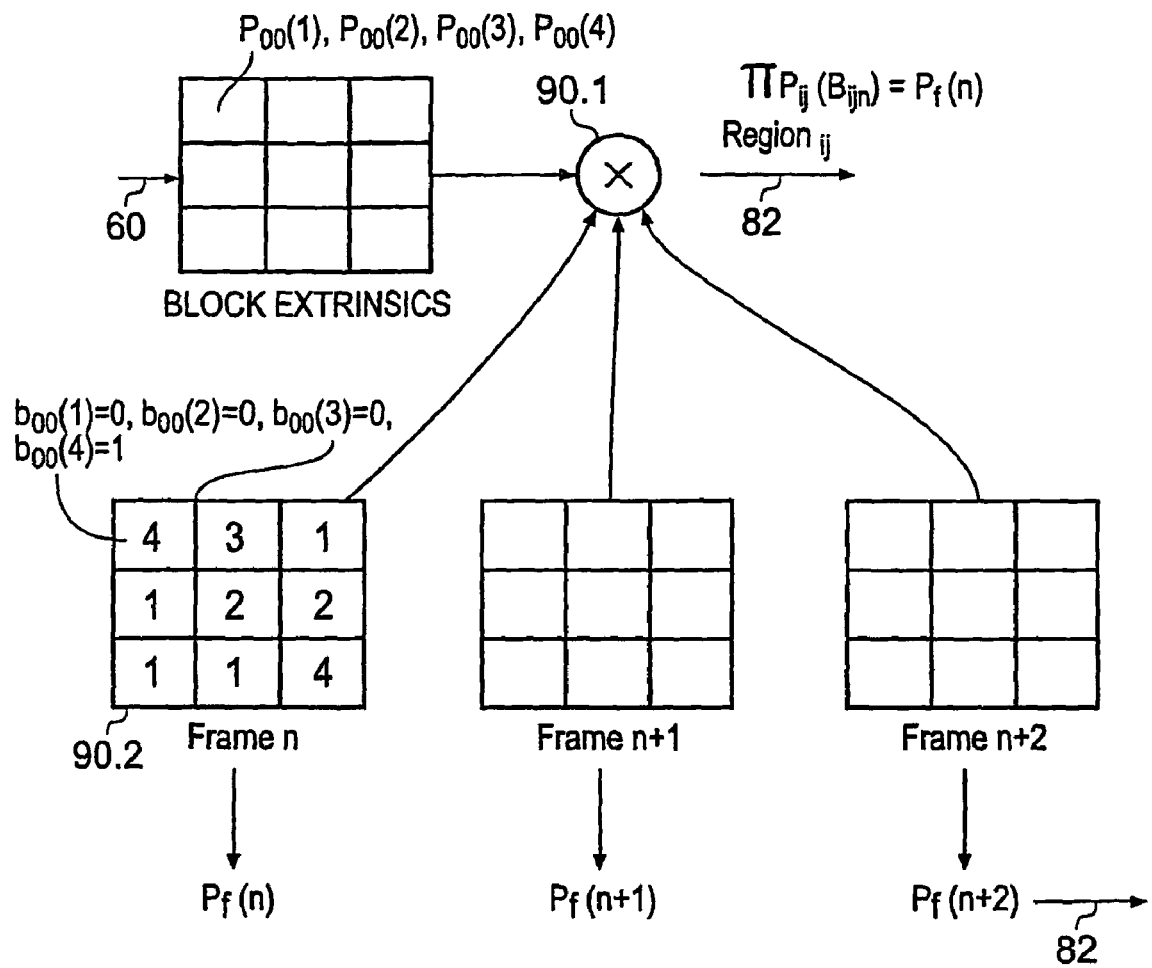
FIG. 12 is a schematic illustration of the operation of a frame number extrinsic calculator, which appears in FIG. 7.
Figure 12:
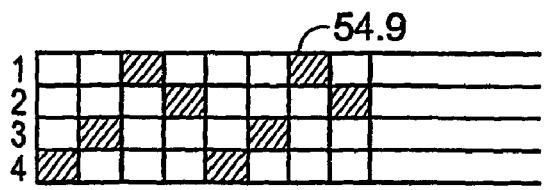

In FIG. 12 the block extrinsic probabilities are received via channel 60 to one input of a correlating processor 90.1. On another input to the correlating processor 90.1 presence probability values are provided which represent for each frame in the sequence of frames a probability that one of the blocks in the set of blocks is present within a region within that frame. Thus within the frame number extrinsic probability calculator 90 corresponding elements shown in FIG. 9 are provided to generate for each frame the water mark frame pattern. Thus a key sequence regenerator, a scrambler, a water mark block generator and a frame water mark regenerator will also be present to generate a sequence of water mark frames in the predetermined sequence from which the presence probabilities are derived. Thus for example for frame n 90.2 each region will have one of the four possible water mark blocks. Thus as illustrated for the region in column=0 row=0, for frame n water mark block 4 is present, the value of the probability for water mark 4 will be 1 whereas the probability for other water mark blocks will be zero. Thus for each frame corresponding presence probabilities are produced for each region. The presence probabilities are multiplied with the block extrinsic probabilities to provide for each frame a probability that the current frame is that frame in the sequence. Thus as shown in FIG. 12 for frame n the frame number extrinsic probability is formed by multiplying the presence probability by the corresponding block extrinsic probability. This effectively selects the block extrinsic probability for the water mark block which is present for that region and multiplies each of the selected block extrinsic probabilities together to form the probability that the current frame is that frame in the sequence.

As illustrated in the bottom of FIG. 12 a more efficient technique for calculating the frame extrinsic probabilities is illustrated. As shown in FIG. 12, the frame extrinsic probabilities can be calculated efficiently by taking the log of the block extrinsic probabilities and correlating these with the reference mask 54.9 for the key sequence which is generated by the same arrangement shown in FIG. 9. Each of the block extrinsic probabilities selected by the reference mask 54.2 are added to form the log of the probabilities of that frame so that by taking the exponent the frame number extrinsic probability for that frame is generated, in a computationally efficient way.

Thus the output of the frame extrinsic probability calculator 90 on the channel 82 the current estimate of the frame number probabilities is formed, that is to say the current guess that the current frame has a certain probability of being that frame within the predetermined sequence of frames. The frame extrinsic probabilities are then fed to a frame number posteriori probability calculator 84.

Figure 13:
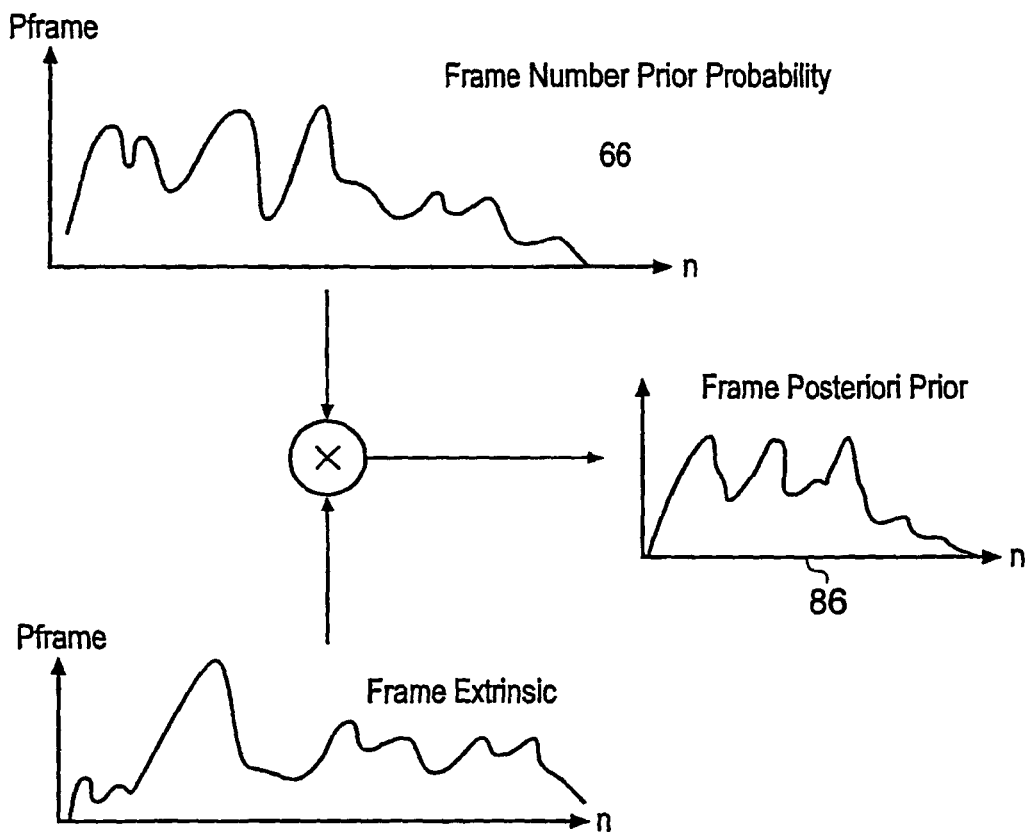
FIG. 13 is a schematic illustration of the operation of a frame posteriori probability calculator which appears in FIG. 7.

The frame number posteriori probability calculator 84 in combination with the next frame number prior probability calculator 87 serve to generate the next frame number prior probabilities which are stored in the data store 48. The next frame number prior probabilities are then forwarded to the next frame prior probability store 47 for a next iteration of the decoder. The operation of the frame number posteriori probability calculator 84 and the next frame prior probability calculator 87 are illustrated in FIG. 13.

Figure 14:
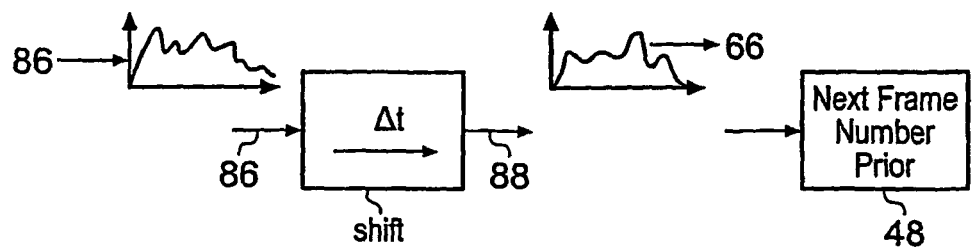
FIG. 14 is a schematic illustration of the operation of a next frame spatial alpha calculator, which appears in FIG. 7.

The frame number posteriori probability calculator 84 and the next frame number prior probability calculator 87 operate in a relatively simple way by multiplying the current frame number extrinsic probabilities produced by the frame number extrinsic probability calculator 90 with the frame number prior probabilities fed received on the channel 66 to produce the frame posteriori probabilities. These are output on a channel 86. Thus as illustrated in FIG. 13 point by point multiplication is performed by a multiplier, multiplying the value for frame n in the frame extrinsic probabilities with the value for frame n for the prior probabilities to produce the value for frame n of the frame number posteriori probability. In order to produce the frame number prior probabilities for the next frame the frame posteriori probabilities received on the channel 86 are simply shifted by one frame cyclically to reflect the form of the probabilities which should correspond to the next frame processed by the decoder. Thus as illustrated in FIG. 14, the frame posteriori probabilities are received on connector 86 shifted by one place by a probability shifting processor 87.1 to produce the next frame number prior probabilities output on the connector 88 to the next frame number prior probabilities store 48. As illustrated in FIG. 7 for the next frame the next frame number prior probabilities are shifted and stored in the frame number prior probability store 47 via a channel 89.

As shown in FIG. 7 the frame spatial prior probabilities 70 are fed to a spatial prior probability generator 71 which generates spatial prior probabilities for use in estimating the distortion in each region of the current water marked image frame. The operation of the spatial prior probability generator 71 is illustrated in FIG. 15.

Figure 15:
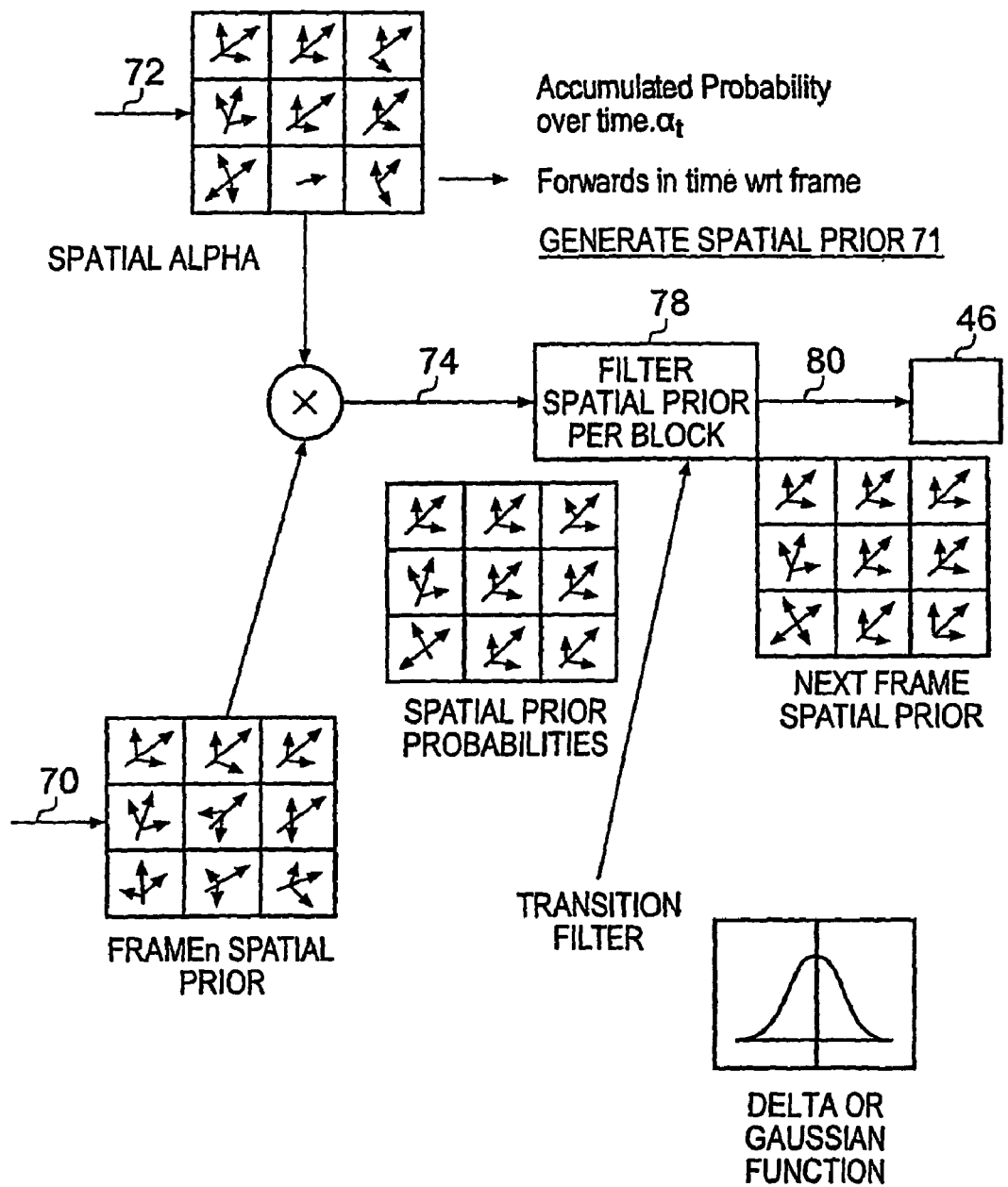
FIG. 15 is a schematic illustration of the operation of a spatial prior probabilities calculator which appears in FIG. 7.

In FIG. 15 as shown in FIG. 7 the spatial prior probability generator receives via a channel 72 an accumulated estimate of the spatial prior probabilities from the data store 45 shown in FIGS. 6 and 7. The accumulated spatial prior probabilities are referred to as spatial alpha t and represent an accumulated estimate of the probability surface for each region, which is accumulated over each of the water marked frames which is processed. Thus, the current spatial prior probability, which is generated, depends on the spatial prior probabilities generated for all previous frames in the sequence of frames.

As mentioned above the spatial prior probability generator receives on the channel 70 the frame spatial prior probabilities from the distortion probability calculator 76. In order to produce the spatial prior probabilities the spatial prior probability calculator 71 performs a point by point multiplication of two probability surfaces for each region. One probability surface is the spatial prior probability for each region and the other is the spatial alpha t probability surface for the corresponding region to perform the spatial prior probabilities which comprise for each region a probability surface.

The spatial prior probabilities output on a channel 74 are filtered with a spatial prior probability filter 78 to produce the next frame spatial alpha t The filtered spatial prior probabilities are output on the channel 80 and stored in the data store 46. Thus the filter 78 forms a transition filter which filters the new probabilities with respect to a likelihood of things occurring that is, how the distortion is expected to vary over time. Likely functions for the filter are a delta function or a gaussian function.

The next frame spatial alpha probabilities are fed from the output data store 46 to the input data store 45 via a channel 91 ready for the next frame to be processed.

Referring back to FIG. 7 the spatial prior probabilities 74 are received by a markov distortion processor 58 which is arranged to generate spatial posteriori probabilities from the spatial prior probabilities and spatial extrinsic probabilities which are generated in calculating the spatial posteriori probabilities. The markov distortion processor 58 and the spatial posteriori probability generator 92 are shown in more detail in FIG. 16.

Figure 16:
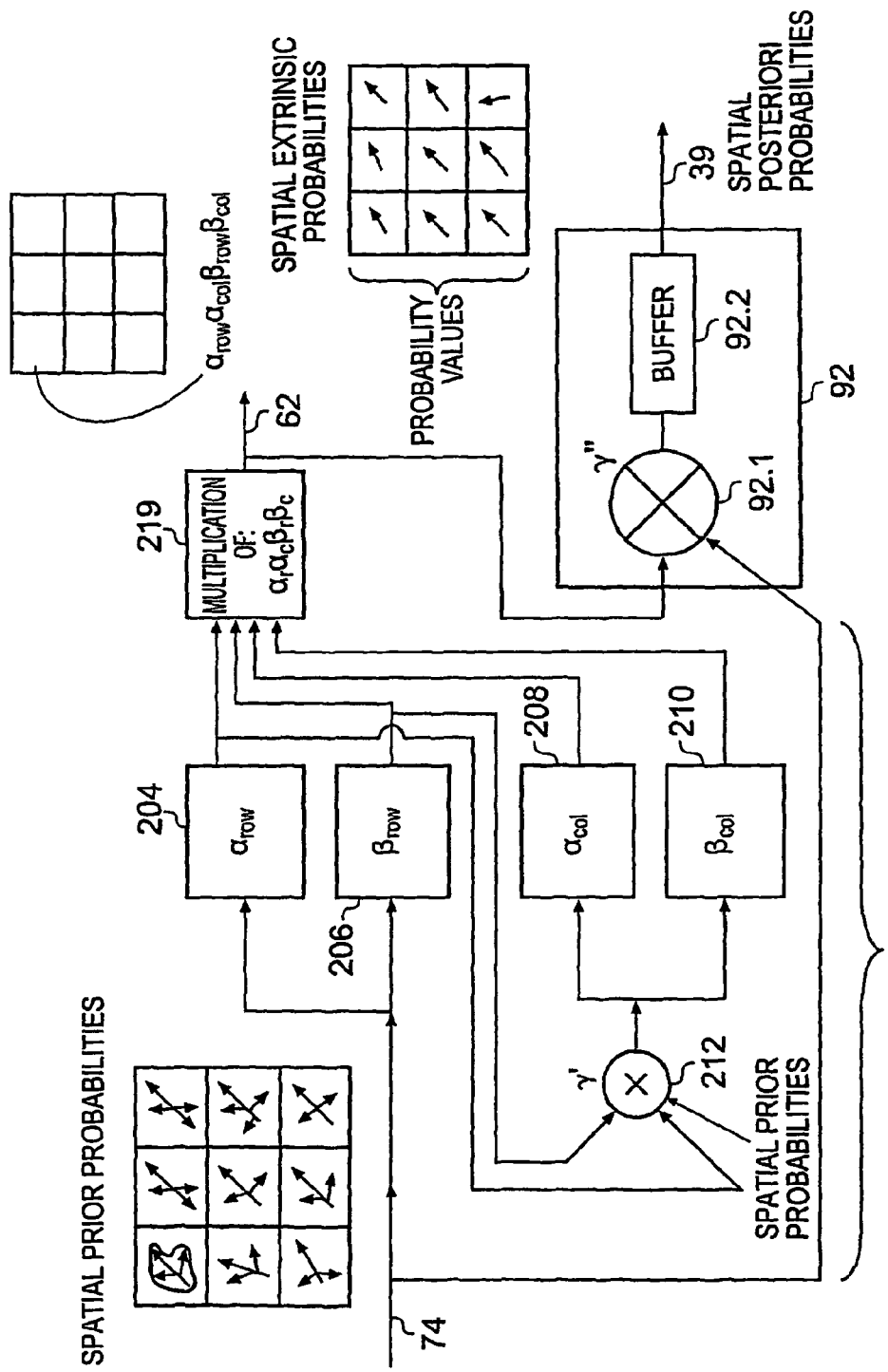
FIG. 16 is a schematic illustration of the operation of a markov distortion processor which appears in FIG. 7.

In FIG. 16 the spatial prior probabilities, which comprise a probability surface for each region are received via channel 74 by a forward probability processor 204 and a backward probability processor 206 which process the spatial prior probabilities row-wise. The forward probability processor 204 is arranged to refine each probability within the probability surface for each region with respect to corresponding probabilities within all other rows for each column. As a result the spatial prior probabilities are refined independence upon all other probability surfaces in that row. Correspondingly, the backward probability processor refines the probabilities within the probability surface for each row but with respect to each probability surface from a corresponding region going backwards along each row. An output of the forward and backward probability processors 204, 206 is past to an extrinsic probability calculator 219 and a combiner 212. The combiner 212 performs a multiplication of the spatial prior probabilities refined by the forwards probability processor 204 and the spatial prior probabilities refined by the backwards probability processor 206 with the spatial prior probabilities to form further refined spatial prior probabilities. The further refined spatial prior probabilities are forwarded to a second forward probability processor 208 and a second backward probability processor 210. The second forward and backward probability processors 208, 210 operate in a corresponding way to the first forward a backward probability processors 204 206 except that the second forward and backward probability processors 208, 210 process the spatial prior probabilities column-wise. That is to say the forward probability processor 208 refines each of the probability surfaces for the spatial prior probabilities by adapting each probability with respect to the corresponding probabilities for all previous regions in each columns. Likewise the backward probability processor 210 refines each of the probability surfaces moving backwards down each column.

After the spatial probabilities have been processed by the second forward and backward probability processes 208, 210, the refined spatial prior probabilities are fed to the spatial extrinsic probability calculator 219. The spatial extrinsic probability calculator 219 multiplies each of the refined versions of the spatial prior probabilities for form on an output conductor 62 spatial extrinsic probabilities for each region. The spatial extrinsic probabilities are then used by the block extrinsic calculator 52 as explained with reference to FIG. 11. The spatial extrinsic probabilities from channel 62 are also passed to the spatial posteriori probability calculator 92. The spatial extrinsic probabilities are received by a multiplier 92.1 and are multiplied with the original spatial prior probabilities to form a combined probability surface for each region. A buffer 92.2 then stores the distortion vectors for each region from the probability surface formed by the multiplier 92.1 to produce the spatial posteriori probability distributions for each region which are output on connector 39. The spatial posteriori probabilities are the best guess of the distortion for each region for the current iteration for the current frame of the processed video sequence. A more detailed explanation of the operation of the markov distortion processor shown in FIG. 16 is provided in annex 2.

Figure 17:
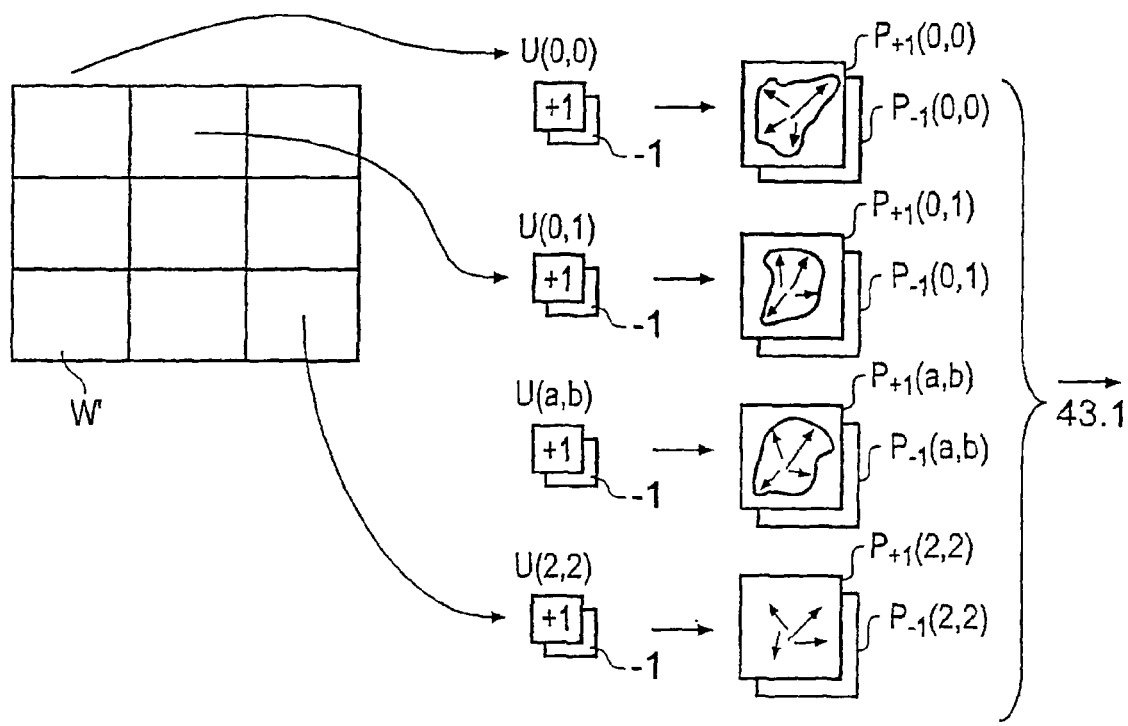
FIG. 17 is a schematic illustration of the operation of a block match prior probabilities calculator which appears in FIG. 6.

Returning to FIG. 6 an explanation of the operation of the detection of the payload data will now be explained with reference to FIGS. 17 and 18.

As shown in FIG. 6 the received water mark image frames are passed to a block match probability processor 43. As for the block match prior probability calculator 50 which appears in FIG. 7, the two dimensional payload blocks produced by the payload block generator 44 are correlated with each region of the water marked image frame which is illustrated by FIG. 17. Thus as shown in FIG. 17 the water mark image frame for the current frame is correlated with respect to the positive water marked block and the negative water mark block to produce for each region a probability surface for the positive water mark in that region and a negative water mark in that region. Each of these probability surfaces is then forwarded to the block probability calculator 40 via the connecting channel 43.1. The operation of the block probability calculator 40 is illustrated in FIG. 18.

Figure 18:
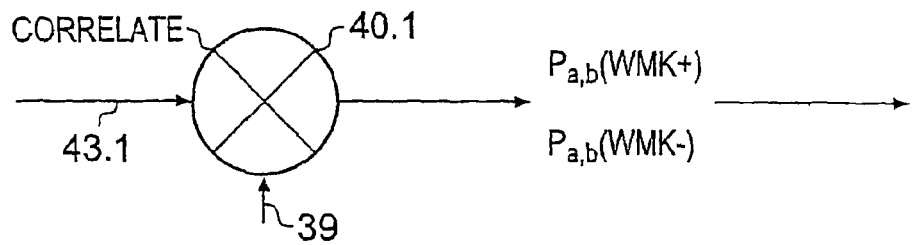
FIG. 18 is a schematic illustration of the operation of a spatial posteriori probabilities calculator which appears in FIG. 6.
Figure 18:
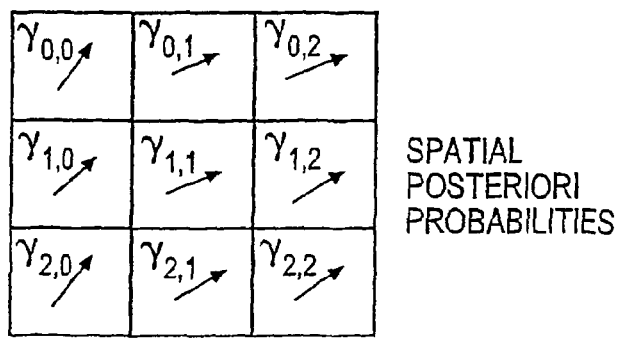
Figure 19:
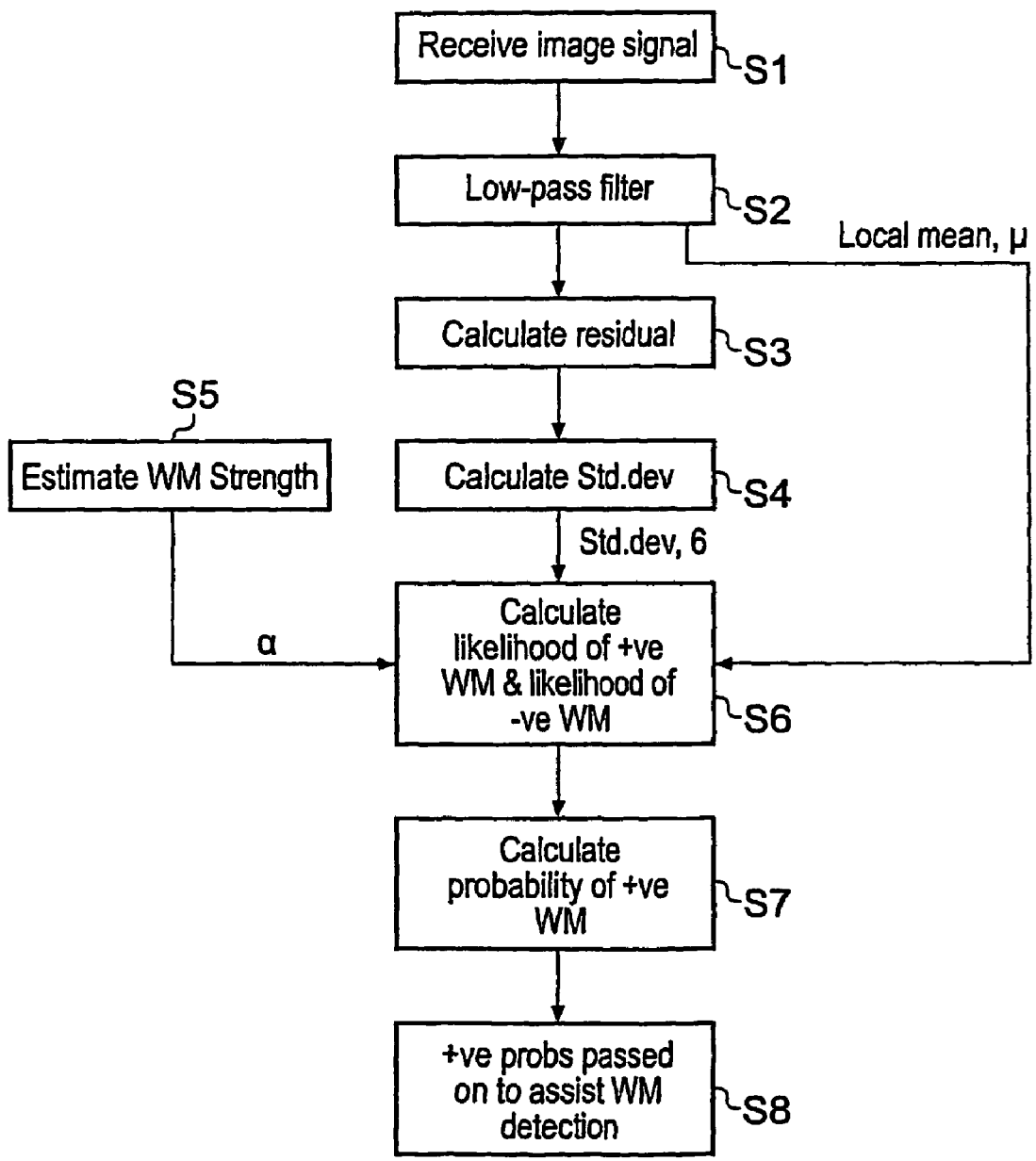
FIG. 19 schematically illustrates a method of detecting a watermark in a received image according to an embodiment of the invention.

In FIG. 18 the spatial posteriori probabilities are received via the connecting channel 39 by a combiner 40.1 and the block match prior probabilities are received from the connecting channel 43.1 by a second input of the combiner 40.1. The block prior probabilities calculator 40 operates in a corresponding way to the distortion of probability calculator 76 except that the block probabilities calculator 40 marginalises the spatial posteriori probabilities with the probability surface for each of the positive or negative water marked blocks for each region to obtain a spatial probability distribution for each block and region. This is done by multiplying the probability and adding for each probability value within the surface to produce for each region a probability that that region contains a positive watermark and that region contains a negative water mark. These probability values are then unscrambled by an unscrambling processor using a scrambling key known from the encoder and forwarded to a soft error correction decoder.

The soft error correction decoder 42 operates to perform a soft decision decoding process using the positive probability values and the negative probability values for each region to recover the payload data work. As those familiar with error correction coding will appreciate soft decision decoding provides a considerable advantage in terms of correcting errors in a payload with respect to a signal to noise ratio available for detecting that payload. An advantage is provided by the present technique in that by maintaining likelihood values for the probabilities of the positive and negative values in each region throughout the detection and decoding process, soft decision decoding can be used to recover the payload data word more accurately. The payload data word is therefore output on a conductor 42.1.

Annex 1: Local Probabilities Calculator

Figure 21:
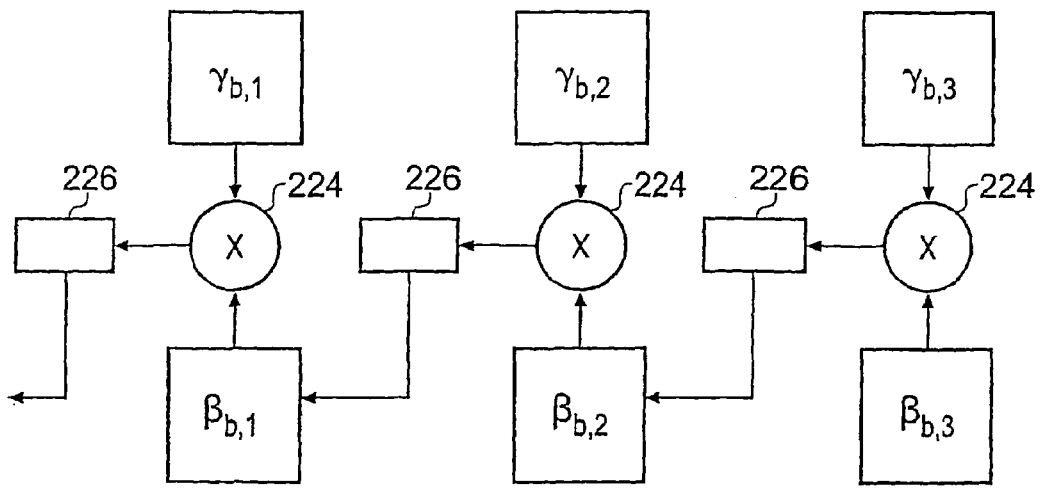
FIG. 21 is a schematic block diagram of a backward probability estimator as shown in FIG. 16.

The operation of the local probabilities calculator to form a probability value that a water mark code word coefficient with a water mark block is positive or the water code word coefficient is negative is illustrated by the flow diagram shown in FIG. 21. FIG. 21 schematically illustrates a method of detecting a watermark in a received image. At a step S1, an image signal is received at the local probability calculator 100. At a step S2, the received image signal is low-pass filtered. The low pass filter removes high-frequency changes in the received image signal, thereby de-noising the signal. As described above, generally, the watermark signal will comprise higher frequency components than the original image signal, and therefore the low-pass filtering operation will tend to remove more of the watermark signal than the original image signal. The low-pass filtered signal generated at the step S2 constitutes a local mean for each signal sample of the received image signal. The invention is not limited to a particular type of filter. The term low-pass-filter infers only that high-frequency changes in signal level are attenuated while low frequency changes are substantially preserved.

At a step S3, the low-pass filtered signal is subtracted from the received image signal to generate a residual signal, the residual signal being a first estimate of the watermark signal embedded in the received image signal. It will be appreciated that similar results will be obtainable if the received image signal were to be subtracted from the low-pass-filtered signal. At a step S4, the residual signal is used to generate the standard deviation of the received image signal. Specifically, the residual signal generated at the step S3 is squared, and thereby made positive, and then filtered. The squared and filtered residual signal is defined as the standard deviation of the received image signal. As described above, other methods for determining the standard deviation of the received image signal may also be used.

At a step S5, an initial estimate of watermark signal strength for a particular signal sample is generated. The same watermark signal estimate may or may not be used for each signal sample within the received signal. While it is advantageous for the initial estimate to be as accurate as possible, it will be understood that, in embodiments where a revised watermark strength estimate is to be provided, the actual probability generated for the watermark being positive will be based also on the revised estimate.

At a step S6, the watermark estimator calculates two likelihood functions for the particular signal sample. These are a likelihood function describing the likelihood that the watermark signal added to the particular signal sample is positive, and a likelihood function describing the likelihood that the watermark signal added to the particular signal sample is negative. Each of these likelihood functions is a generalised gaussian function based on the calculated local mean, the calculated standard deviation and the estimated watermark strength. The likelihood functions describe the likelihood of a positive and negative watermark respectively, as a function of the signal sample, x.

At a step S7, the probability that the watermark signal added in respect of a current signal sample is positive is determined from the first and second likelihood functions.

At a step S8, the probability in respect of each image pixel is provided to other components of the decoder to assist the detection of the watermark within the image.

Annex 2: Markov Distortion Processor

A more detailed illustration of the markov distortion processor illustrated in FIGS. 7 and 16 will now be provided. The spatial prior probabilities for each image block in a row b and a column n, provide an observed probability distribution of distortion vectors $\gamma_{b,n}$. The observed probability distribution of distortion vectors for each block represents a likelihood of possible shifts of the image block within the water marked image frame with respect to a position of the block in the original version of the image. The observed probability distribution of distortion vectors $\gamma_{b,n}$ are then processed by a forward probability estimator 204 and a backward probability estimator 206.

As will be explained the distortion vectors are processed according to a predetermined pattern to the effect of calculating for each image block a forward probability distribution estimate of possible distortion vectors and a backward probability distribution estimate of possible distortion vectors depending upon previous and subsequent estimates of the forward and backward probability estimates respectively. For the example embodiment illustrated in FIG. 16, the predetermined pattern is such that the image blocks are processed in rows and subsequently processed as columns. Thus a two-pass estimate performed with the effect that a probability of distortion vectors in each image block is determined after processing the image blocks in rows and then refined probability distortion vectors are formed after processing the image blocks in columns. However in other embodiments, other predetermined patterns may be used and only a single pass may be used to generate the most likely distortion vector for each block.

The observed distortion vectors $\gamma_{b,n}$ for the image blocks are then communicated to a forward probability estimator 204 and a backward probability estimator 206. As will be explained in more detail in the following paragraphs, the forward probability estimator generates a probability distribution estimate of possible distortion vectors within each of the image blocks. The forward probability distribution estimates are calculated from previously calculated probability estimates from image blocks, which have already been calculated for previous image blocks in each row, moving forward along the row. For each block in the row, the observed distortion vector $\gamma_{b,n}$ calculated by the distortion vector estimator is combined with the currently determined forward probability estimate which has been calculated from previous image blocks moving along the row. The forward probability estimates are therefore calculated recursively from previous blocks in the row. This can perhaps be better understood from the diagram in FIG. 20.

Figure 20:
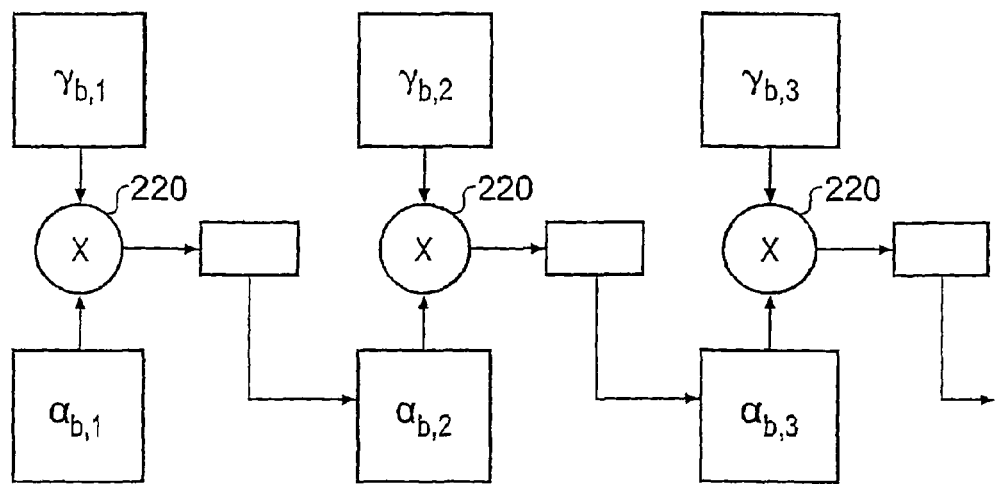
FIG. 20 is a schematic block diagram of a forward probability estimator as shown in FIG. 16.

FIG. 20 provides a schematic illustration of an example operation of the forward probability estimator 204, in which the first three forward probability distortion vectors are calculated recursively for the first three image blocks. As illustrated the forward probability estimates $\alpha_{b,1}$, $\alpha_{b,2}$ and $\alpha_{b,3}$ are calculated from corresponding distortion vector estimates determined for the first three blocks in a row b of the image $\gamma_{b,1}$, $\gamma_{b,2}$ and $\gamma_{b,3}$. As shown in FIG. 18, each of the forward probability estimates is calculated recursively from the probability estimate from the previous image block in the row. Thus for example, the forward probability estimate for the second image block $\alpha_{b,2}$ is calculated by a multiplier 220 multiplying the distortion vector estimate $\gamma_{b,1}$ for the first image block with an estimate of the forward probability $\alpha_{b,1}$ for the first image block. Thereafter the subsequent forward probability estimate $\alpha_{b,n}$ is determined by multiplying the forward probability estimate $\alpha_{b,n-1}$ and the distortion vector estimate $\gamma_{b,n-1}$ for the image block of the previous image block in the row b. As such, each of the forward probability distribution estimates is calculated recursively from probability distribution estimates from previous image blocks.

For the first image block in each row, the forward probability distortion estimate $\alpha_{b,1}$ is set so that the probability of each of the possible distortion vectors are equally likely.

As illustrated in FIG. 20, each forward probability estimate is passed through a filter, which convolves the forward probability estimate $\alpha_{b,n}$ with a probability distribution with respect to time. The probability distribution is provided so that after the forward probability estimate $\alpha_{b,n}$ has been filtered, the forward probability estimate $\alpha_{b,n}$ is biased or modified in accordance with a likelihood of that value occurring. In one example, the probability distribution is a Gaussian distribution. Effectively, the forward probability distribution is modulated with a two-dimensional Gaussian probability distribution thereby expressing the forward probability distribution of the distortion vectors with respect to a relative likelihood of that distortion vector occurring.

A corresponding example illustrating the operation of the backward probability estimator 206 is provided in FIG. 21. The backward probability estimator 206 operates in a way which is similar to the operation of the forward probability estimator 204 shown in FIG. 6 except that each backward probability estimate $\beta_{b,n}$ is calculated recursively by a multiplier 224 multiplying the subsequent probability estimate $\beta_{b,n+1}$ for the subsequent block with the observed distortion vector estimate for the subsequent block $\gamma_{b,n+1}$. Thus, the backward probability estimator 206 works in a way, which corresponds to the forward probability estimator 204, except that each backward probability estimate is calculated recursively from subsequent distortion vector probability estimates. As with the forward probability estimator 204, each backward probability estimate is filtered with a probability distribution using a filter 226, which biases the estimate in accordance with a likelihood of that probability estimate occurring. Again, an example of a probability distribution is the Gaussian distribution.

For the last image block in each row, the backward probability distortion estimate $\beta_{b,L}$ is set so that the probability of each of the possible distortion vectors are equally likely.

As explained and illustrated in FIGS. 20 and 21, for each of the forward and backward distortion probability estimates a Gaussian probability distribution is applied by first and second Gaussian filters 208, 210. For each image block, the forward and backward probability distributions provide a two dimensional distribution of possible distortion vectors. An effect of filtering the forward and backward probability estimates is to bias the distortion vector value to a likelihood of that value occurring according to the Gaussian distribution. Effectively, the probability distribution is modulated with the two-dimensional Gaussian probability distribution thereby expressing the probability distribution of the distortion vectors with respect to a relative likelihood of that distortion vector occurring.

The following expressions define mathematically the calculations of the distortion vector estimates, the forward probability distortion estimates and the backward probability distortion estimates, where p( ) is the observed probability of a vector $\phi_n$ for the observed probability $O_n$ for n-th block and the motion vector b:

The observed probability distribution of distortion vectors $\gamma_{b,n}$, and the forward and backward probability distortions $\alpha_{b,n}$, $\beta_{b,n}$ are then combined by a combining engine 212 to form for each image block a most likely distortion vector value $\gamma'_{b,n}$ after the image blocks have been processed row-by-row. The combining engine 212 multiplies together the estimated distortion vector $\gamma_{b,n}$, the forward probability distribution $\alpha_{b,n}$, and the backward probability distribution $\beta_{b,n}$, to form a most likely estimate of distortion vectors $\gamma'_{b,n}$.

Various modifications may be made to the embodiments herein for described without departing from the scope of the present invention. For example it will be appreciated that although four possible water mark blocks have been used for the distortion and frame synchronisation detection, any member of blocks can be used to form the predetermined set of blocks to generate this water mark. Furthermore, although the example has been illustrated with respect to a frame comprising only nine regions, it would be appreciated that in practice any number of regions could be used to match the number of bits that are to be encoded with each image frame.

The invention claimed is:

1. A detecting data processing apparatus for detecting payload data from a water marked image that has been generated by combining an image frame with a two-dimensional water mark pattern, the water mark pattern comprising a plurality of regions, each region of the pattern being associated with one of a plurality of symbols of the payload data word, each region of the water mark pattern including a two dimensional water mark block selected from a predetermined set of possible water mark blocks to represent the value of the payload data symbol associated with that region, the apparatus comprising a block match prior probability calculator configured
    to correlate each region of the water marked image frame with each of the water marked blocks from the set of water marked blocks,
    to form for each region a set of block match probability surfaces, each block match probability surface providing a two-dimensional distribution of probability vectors, for each possible water mark block, representing a probability that the water mark block is present at a position identified by that distortion vector, and

| | |
|---|---|
| The probability estimate of a motion vector for block n being in a position b given only that block's correlation surface; | $\gamma_{b,n} \equiv p(\phi_n = b \mid O_n)$ |
| The probability estimate of a motion vector for block n being in a position b given that all the correlation surfaces of blocks to the "left" along the row (previous image blocks moving forward in time); | $\alpha_{b,n} \equiv p(\phi_n = b \mid O_{m<n})$ |
| The probability estimate of a motion vector for block n being in position b given all the correlation surfaces of blocks to the "right" along the row (subsequent image blocks moving backward in time) | $\beta_{b,n} \equiv p(\phi_n = b \mid O_{m>n})$ |
| The probability estimate of the motion vector for block n being in position b given all the correlation surfaces (final answer) | $\lambda_{b,n} \equiv p(\phi_n = b \mid O_{m-1,N}) \propto \alpha\beta\gamma$ |
| The probability of motion vector n being b given that the block to immediate lefts motion vector was definitely in position c (transition probability) | $t_{b,c} \equiv p(\phi_n = b \mid \phi_{n-1} = c)$ | a payload probabilities calculator configured
   to combine a distortion probability value for each region with each of the block match probability surfaces for each of the water mark blocks that may be present in the region,
   to form for each region, for each of the possible values of the payload symbol a probability value that that region includes that symbol value, and
   to form from the probability values for each symbol value from each of the regions of the water mark frame a set of payload probability values representing the probability of each of the possible symbol values for each payload symbol, from which an estimate of the payload data can be generated from the payload probability values.

2. A detecting data processing apparatus as claimed in claim 1, wherein the payload probabilities calculator is configured to combine the distortion probability value for each region of the water marked image frame with the block match probability surfaces for each region by correlating the distortion probabilities with the block match probability surfaces.

3. A detecting data processing apparatus as claimed in claim 1, wherein the payload probabilities calculator is configured to combine the distortion probability value for each region of the water marked image frame with the block match probability surfaces for each region by forming a dot product of the distortion probabilities with the block match probability.

4. A detecting data processing apparatus as claimed in claim 1, wherein
   the payload data represented by the water mark pattern from which the water marked image is formed has been error correction encoded, and
   the detecting data processing apparatus further comprises an error correction decoder configured to receive the set of payload probability values and to perform a soft decision error correction decoding algorithm to generate an estimate of the payload data from the payload probability values.

5. A detecting data processing apparatus as claimed in claim 1, wherein
   the water mark blocks within the frame pattern are scrambled before the water mark frame is combined with the image frame, and
   the detecting data processing apparatus further comprises a de-scrambling processor configured to receive the payload probability values and to change the order of the payload probability values in accordance with the scrambling of the order of the water mark blocks in the water mark frame pattern applied when the water marked image was formed.

6. A detecting data processing apparatus as claimed in claim 1, further comprising a blind alignment decoder configured to receive the water marked image frame and to generate spatial probability distortion vector values including for each of the regions of the water marked image frame at least one probability value that the distortion within that region of the water marked image is represented by a calculated distortion vector.

7. A detecting data processing apparatus as claimed in claim 6, wherein
   the water mark pattern representing the payload data is a first water mark pattern and the water mark image frame is formed from a combination of the first water mark pattern and a second water mark pattern,
   the second water mark pattern is comprised of a plurality of regions each of which includes one of plurality of possible two-dimensional water mark blocks from a second set of water mark blocks, and
   the blind alignment decoder is configured
   to generate the spatial probability distortion vectors by correlating each of the water mark blocks with each region of the second water mark pattern,
   to form a spatial probability surface for each possible water mark block from the second set of water mark blocks, for each region comprising a two dimensional distribution of distortion vectors, and
   to combine the spatial probability surfaces of each possible water mark block for each region with a probability of that water mark block being present within that region, to form the spatial probability distortion vector values for each region.

8. An encoding data processor configured to form a water marked image by combining payload data with a copy of the image, the encoding data processor comprising
   a first water mark block generator configured to generate each of a first set of two-dimensional blocks of water mark coefficients each being representative of one of a plurality of possible values of payload data word symbols,
   a second water mark block generator configured to generate each of a second set of two-dimensional blocks of water mark coefficients each being representative of one of a plurality of possible values of a set of values,
   a first water mark frame pattern former configured
      to form a water mark frame comprising a plurality of regions, each region being associated with one of the symbols in the payload data, and
      to select one of the first blocks of water mark coefficients from the first set of blocks of water mark coefficients in accordance with the symbol value of the payload symbol associated with the region to form a first water mark pattern,
   a sequence generator configured to generate a sequence of block selection values, each selection value identifying one of the predetermined second set of blocks of water mark coefficients,
   a second water mark frame pattern former configured to form blocks identified by a key sequence into a second water mark pattern providing a plurality of regions, each of the blocks identified by the key sequence being provided for one of the regions of the pattern, and
   a water mark combiner configured to combine and overlay the first and second water mark patterns with the image frame to form the water marked image.

9. An encoding data processor as claimed in claim 8, further comprising a scrambler configured to change an order of the water mark blocks in at least one of the first and second water mark patterns for the image frame in accordance with one or more scrambling codes, before scrambled water mark patterns are combined with the image frame.

10. A method of detecting payload data from a water marked image that has been encoded with a two-dimensional water mark pattern, the water mark pattern comprising a plurality of regions, each region of the pattern being associated with one of a plurality of symbols of the payload data word, each region of the water mark pattern including a two dimensional water mark block selected from a predetermined set of possible water mark blocks to represent the value of the payload data symbol associated with that region, the method comprising
   correlating each region of the water marked image frame with each of the water marked blocks from the set of water marked blocks, to form for each region a set of block match probability surfaces, each block match probability surface providing a two-dimensional distribution of probability vectors, for each possible water mark block, representing a probability that the water mark block is present at a position identified by that distortion vector, combining a distortion probability value for each region with each of the block match probability surfaces for each of the water mark blocks that may be present in the region, to form for each region, for each of the possible values of the payload symbol a probability value that that region includes that symbol value, forming from the probability values for each symbol value from each of the regions of the water mark frame a set of payload probability values representing the probability of each of the possible symbol values for each payload symbol, from which an estimate of the payload data can be generated.

11. A computer program product having a non-transitory computer readable medium having recorded thereon a computer program providing computer executable instructions, which when loaded on to a data processor causes the data processor to perform the method according to claim 10.

12. A non-transitory carrying medium including a computer program providing computer executable instructions, which when loaded on to a data processor causes the data processor to perform the method according to claim 10.

13. A method of forming a water marked image by combining payload data with a copy of the image, the method comprising generating each of a first set of two-dimensional blocks of water mark coefficients, each block of water mark coefficients being representative of one of a plurality of possible values of payload data word symbols, generating a second set of two-dimensional blocks of water mark coefficients each being representative of one of a plurality of possible values of a set of values, forming a first water mark frame including a plurality of regions, each region being associated with one of the symbols in the payload data, selecting one of the first blocks of water mark coefficients from the first set of blocks of water mark coefficients in accordance with the symbol value of the payload symbol associated with the region to form a first water mark frame pattern, generating a sequence of block selection values, each selection value identifying one of the predetermined second set of blocks of watermark coefficients, forming the blocks identified by a key sequence into a second water mark pattern providing a plurality of regions, each of blocks identified by the key sequence being provided for one of the regions of the pattern, and combining and overlaying the first and the second water mark patterns with a copy of the image frame to form the water marked image.

14. A computer program product having a non-transitory computer readable medium having recorded thereon a computer program providing computer executable instructions, which when loaded on to a data processor causes the data processor to perform the method according to claim 13.

15. A non-transitory carrying medium including a computer program providing computer executable instructions, which when loaded on to a data processor causes the data processor to perform the method according to claim 13.

16. A data detection processor configured to marginalise over a first probability surface representing a two dimensional probability distribution of a distortion of a water mark region in order to determine a probability of a presence of a value represented by a water mark block, by forming a dot product of the first probability distortion surface with a second probability value representing the presence of the value.

17. An apparatus for detecting payload data from a water marked image that has been encoded with a two-dimensional water mark pattern, the water mark pattern comprising a plurality of regions, each region of the pattern being associated with one of a plurality of symbols of the payload data word, each region of the water mark pattern including a two dimensional water mark block selected from a predetermined set of possible water mark blocks to represent the value of the payload data symbol associated with that region, the apparatus comprising means for correlating each region of the water marked image frame with each of the water marked blocks from the set of water marked blocks, to form for each region a set of block match probability surfaces, each block match probability surface providing a two-dimensional distribution of probability vectors, for each possible water mark block, representing a probability that the water mark block is present at a position identified by that distortion vector, means for combining a distortion probability value for each region with each of the block match probability surfaces for each of the water mark blocks that may be present in the region, to form for each region, for each of the possible values of the payload symbol a probability value that that region includes that symbol value, means for forming from the probability values for each symbol value from each of the regions of the water mark frame a set of payload probability values representing the probability of each of the possible symbol values for each payload symbol, from which an estimate of the payload data can be generated.

18. An apparatus for forming a water marked image by combining payload data with a copy of the image, the apparatus comprising means for generating each of a first set of two-dimensional blocks of water mark coefficients, each block of water mark coefficients being representative of one of a plurality of possible values of payload data word symbols, means for generating each of a second set of two-dimensional blocks of water mark coefficients each being representative of one of a plurality of possible values of a set of values, means for forming a first water mark frame comprising a plurality of regions, each region being associated with one of the symbols in the payload data, means for selecting one of the first blocks of water mark coefficients from the first set of blocks of water mark coefficients in accordance with the symbol value of the payload symbol associated with the region to form a first water mark frame pattern, means for generating a sequence of block selection values, each selection value identifying one of the predetermined second set of blocks of water mark coefficients, means for forming blocks identified by a key sequence into a second water mark pattern providing a plurality of regions, each of the blocks identified by the key sequence being provided for one of the regions of the pattern, and means for combining and overlaying the first and second water mark frame patterns with the copy of the image frame to form the water marked image.

* * * * *